(12) United States Patent
Ishihara et al.

(10) Patent No.: US 12,294,641 B2
(45) Date of Patent: May 6, 2025

(54) INFORMATION STORAGE DEVICE AND INFORMATION STORAGE SYSTEM

(71) Applicant: Kioxia Corporation, Tokyo (JP)

(72) Inventors: Takeshi Ishihara, Yokohama (JP); Yoshihiro Ohba, Kawasaki (JP)

(73) Assignee: Kioxia Corporation, Tokyo (JP)

( * ) Notice: Subject to any disclaimer, the term of this patent is extended or adjusted under 35 U.S.C. 154(b) by 232 days.

(21) Appl. No.: 17/930,198

(22) Filed: Sep. 7, 2022

(65) Prior Publication Data
US 2023/0308258 A1    Sep. 28, 2023

(30) Foreign Application Priority Data
Feb. 7, 2022   (JP) ................... 2022-017381

(51) Int. Cl.
*H04L 9/06*   (2006.01)
*H04L 9/14*   (2006.01)

(52) U.S. Cl.
CPC .............. *H04L 9/0618* (2013.01); *H04L 9/14* (2013.01)

(58) Field of Classification Search
CPC ..... H04L 9/00; H04L 9/06; H04L 9/08; H04L 9/14; H04L 9/16; H04L 9/50; H04L 9/085; H04L 9/0618; H04L 9/0643; H04L 9/0656; H04L 9/0863; H04L 9/3249; H04L 63/0435; H04L 63/0478; G06F 21/78; G06F 21/602
USPC ......................................................... 713/193
See application file for complete search history.

(56) References Cited

U.S. PATENT DOCUMENTS

| | | | |
|---|---|---|---|
| 8,819,335 | B1 | 8/2014 | Salessi et al. |
| 9,634,827 | B2 * | 4/2017 | Onoda ................... H04L 9/0637 |
| 10,678,707 | B2 * | 6/2020 | Poeppelmann .... G11C 16/3427 |
| 11,075,748 | B2 | 7/2021 | Locher et al. |
| 11,343,070 | B2 * | 5/2022 | Dewan ..................... H04L 9/008 |
| 11,456,864 | B2 * | 9/2022 | Guo ....................... H04L 9/3247 |
| 11,989,113 | B2 * | 5/2024 | Blatt ........................ G06F 21/53 |
| 2002/0124179 | A1 * | 9/2002 | Kaminaga ............... H04L 9/004 380/259 |

(Continued)

FOREIGN PATENT DOCUMENTS

JP    2022-61 450 A    4/2022

OTHER PUBLICATIONS

Dean, J. et al. "MapReduce: Simplified Data Processing on Large Clusters", 6th Symposium on Operating Systems Design & Implementation (OSDI '04), 2004, pp. 1-13.

*Primary Examiner* — James N Fiorillo
(74) *Attorney, Agent, or Firm* — Oblon, McClelland, Maier & Neustadt, L.L.P.

(57) ABSTRACT

According to one embodiment, a distribution unit generates a set of first ciphertext fragments based on a first identifier specifying a storage destination of the first ciphertext and a constitution information specifying a constitution of the first ciphertext, generates a deformation command using a second key used for deforming the first ciphertext for at least one fragment belonging to the set of the first ciphertext fragments, and allocates the deformation command to at least one of storage units. A temporary storage unit deforms the first ciphertext fragment by using the second key based on the deformation command, and stores a second ciphertext fragment as a result of the deformation in a non-volatile storage unit instead of the first ciphertext fragment.

20 Claims, 19 Drawing Sheets

(56) References Cited

U.S. PATENT DOCUMENTS

| | | | |
|---|---|---|---|
| 2007/0140478 A1* | 6/2007 | Komano | H04L 9/0618 380/28 |
| 2013/0246813 A1* | 9/2013 | Mori | H04L 9/008 713/193 |
| 2013/0323697 A1* | 12/2013 | Shadduck | G09B 19/22 434/222 |
| 2016/0204932 A1* | 7/2016 | Onoda | H04L 9/0618 380/28 |
| 2018/0145825 A1* | 5/2018 | Isshiki | H04L 9/0618 |
| 2018/0316491 A1* | 11/2018 | Pivovarov | G06F 7/588 |
| 2019/0215157 A1* | 7/2019 | Guo | H04L 9/0618 |
| 2019/0342069 A1* | 11/2019 | Singh | G06F 21/6227 |
| 2020/0076570 A1 | 3/2020 | Musuvathi et al. | |
| 2020/0186331 A1* | 6/2020 | Thompson | H04L 9/0656 |
| 2020/0213140 A1* | 7/2020 | Cambou | H04L 9/3278 |
| 2020/0363994 A1* | 11/2020 | Jing | G06F 3/067 |
| 2021/0119766 A1 | 4/2021 | Suresh et al. | |
| 2022/0107738 A1 | 4/2022 | Ohba et al. | |
| 2022/0407729 A1* | 12/2022 | Zhang | H04L 9/50 |
| 2023/0041959 A1* | 2/2023 | Guccione | H04L 9/0866 |
| 2023/0109352 A1* | 4/2023 | Wang | H04L 9/008 713/153 |
| 2023/0121749 A1* | 4/2023 | Lee | G06Q 20/065 713/171 |
| 2023/0188322 A1* | 6/2023 | Bajpeyi | H04L 9/0618 |
| 2023/0222229 A1* | 7/2023 | Schwaderer | H04L 9/0668 726/26 |
| 2024/0171374 A1* | 5/2024 | Tan | H04L 9/06 |

\* cited by examiner

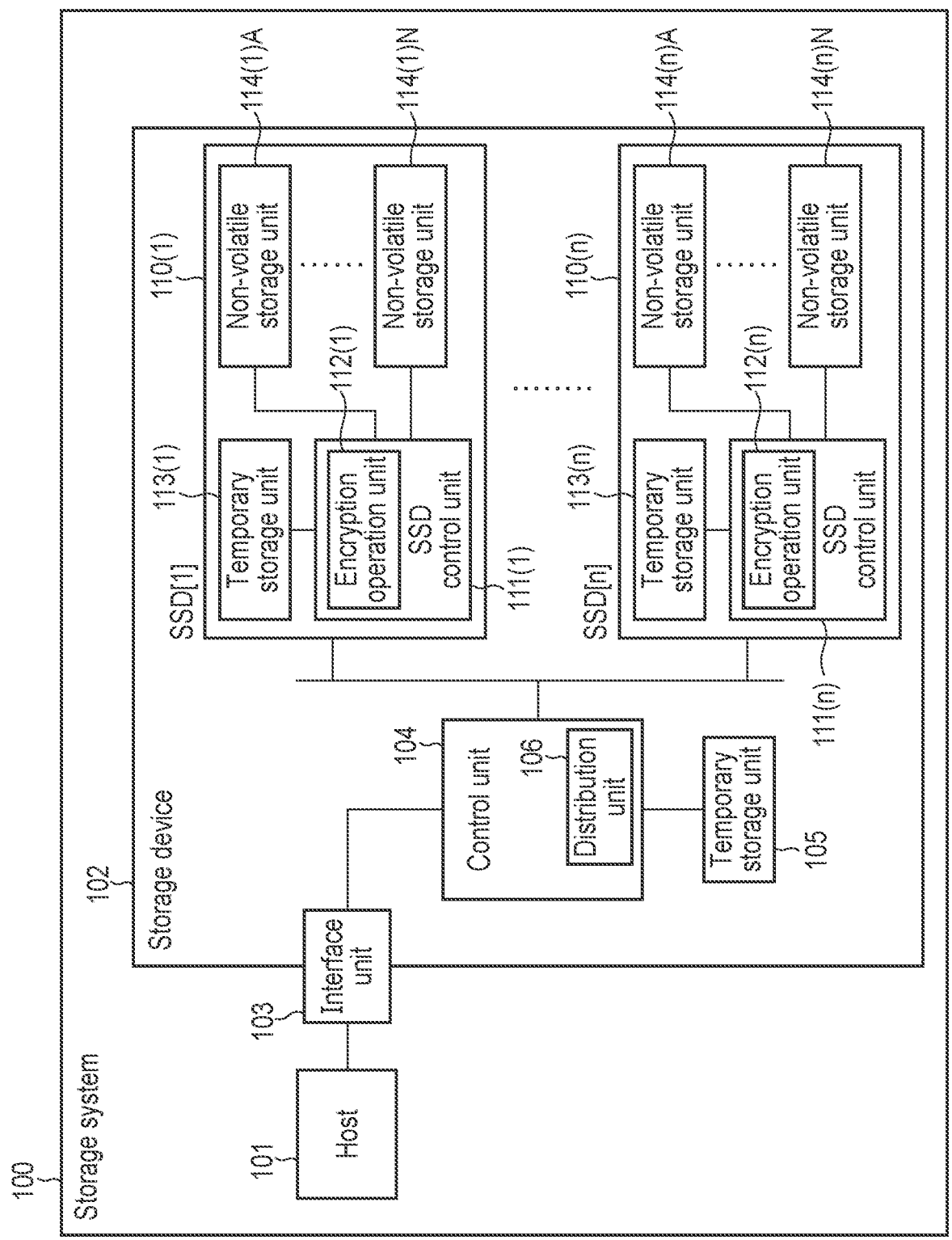
F I G. 1

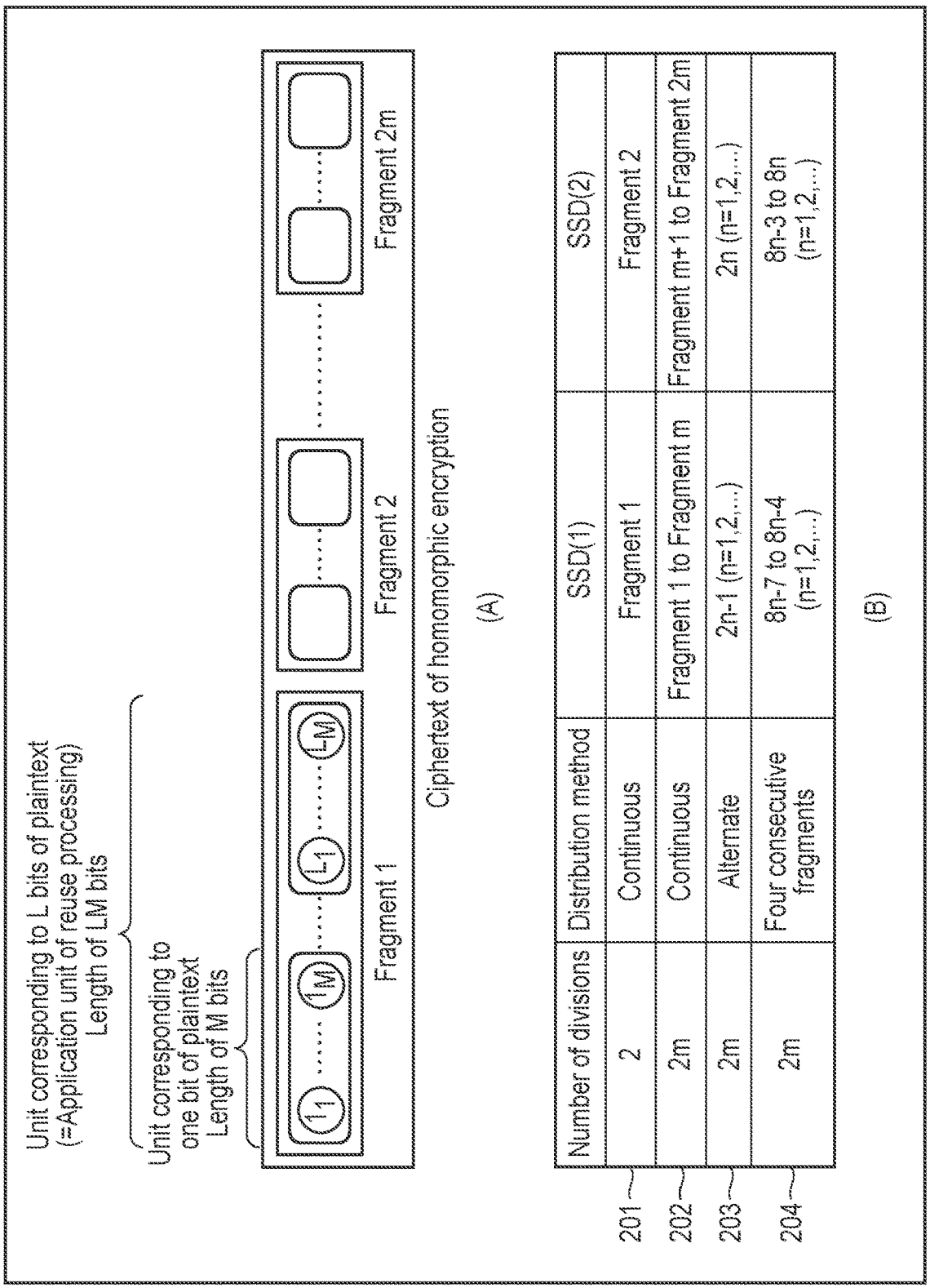
F I G. 2

| Write destination address | Order of fragments | Storage destination SSD | Storage destination address |
|---|---|---|---|
| addr1 | 1 | 1 | addr1-1 |
| | 2 | 2 | addr1-2 |
| | 3 | 3 | addr1-3 |
| | ... | ... | ... |
| addr2 | 1 | 7 | addr2-1 |
| | 2 | 10 | addr2-2 |
| | ... | ... | ... |
| ... | ... | ... | ... |

| Write destination addresses | Index value for auxiliary information | Status of reuse processing | Order of fragments | Storage destination SSDs | Storage destination addresses |
|---|---|---|---|---|---|
| addr1 | 1 | Completed | 1 | 1 | addr1-1 |
|  |  |  | 2 | 2 | addr1-2 |
|  |  |  | 3 | 3 | addr1-3 |
|  |  |  | ... | ... | ... |
| addr2 | 2 | Processing | 1 | 7 | addr2-1 |
|  |  | Completed | 2 | 10 | addr2-2 |
|  |  | Uncompleted | 3 | 13 | addr2-3 |
| ... |  | ... | ... | ... | ... |

(B)

| Index value for auxiliary information | Storage destination SSD of auxiliary information | Storage destination address of auxiliary information |
|---|---|---|
| idx1 | 7 | ADDR2-1 |
|  | 10 | ADDR2-2 |
| ... | ... | ... |

F I G. 8

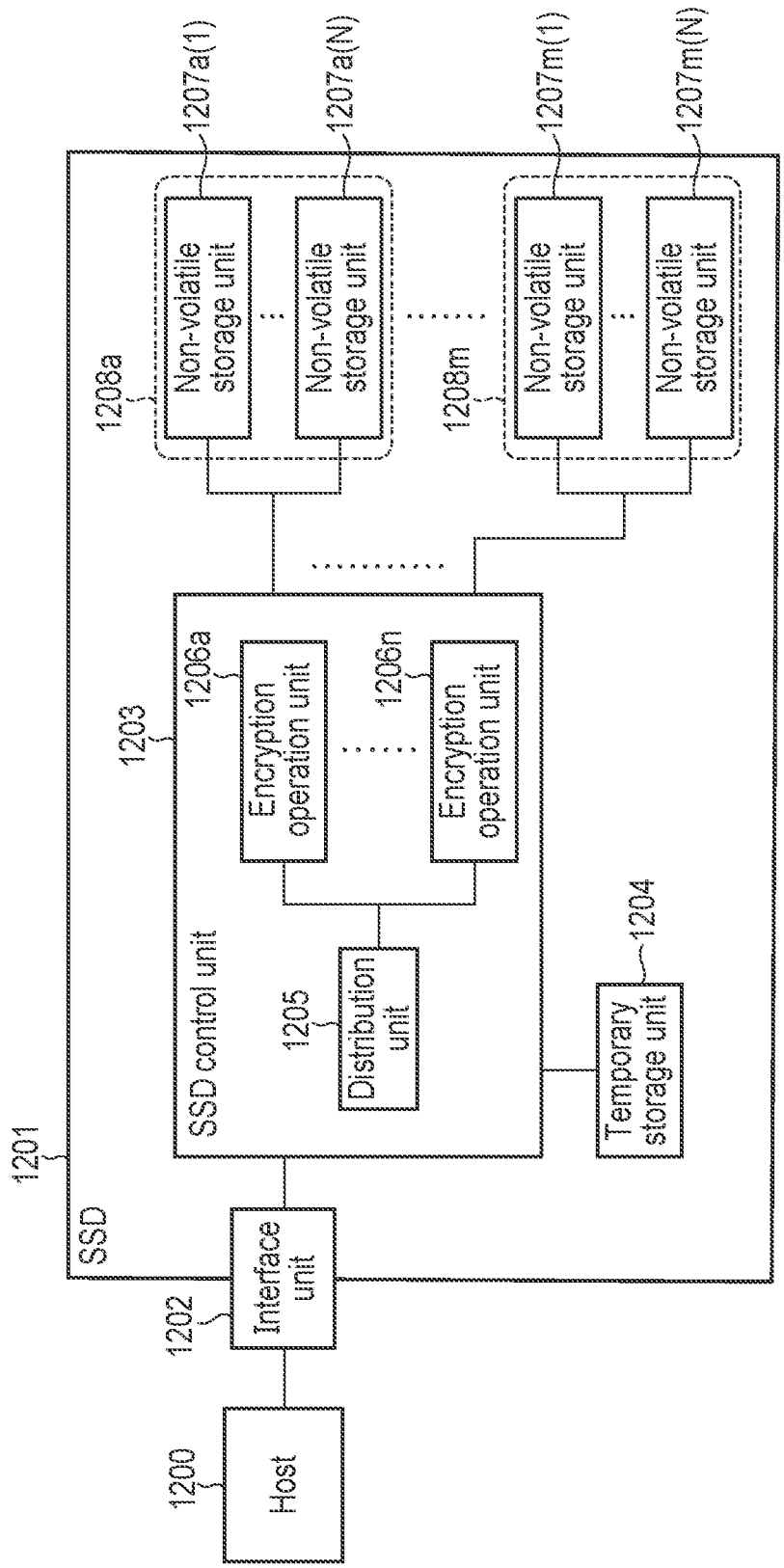
F I G. 12

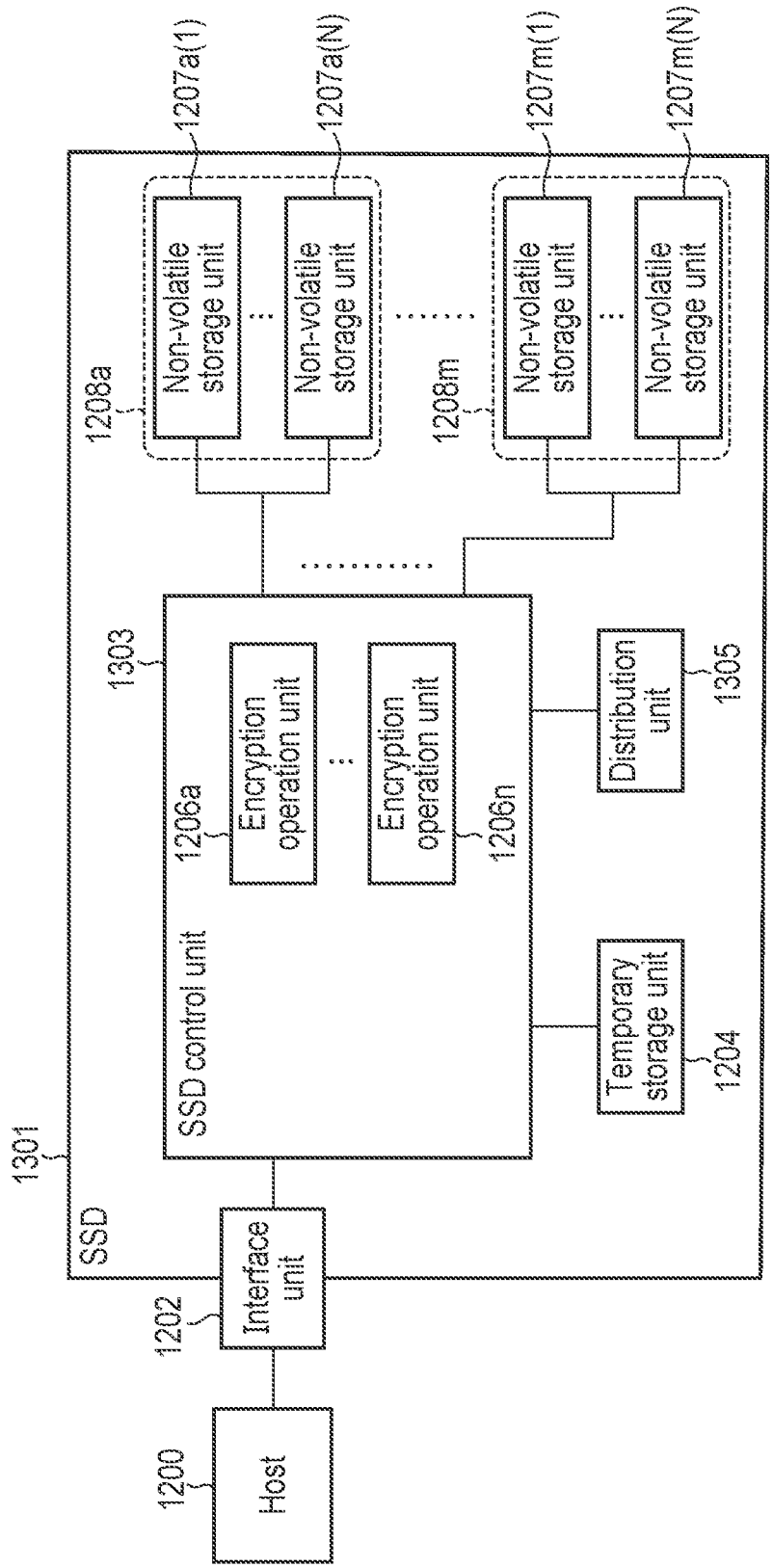
F I G. 13

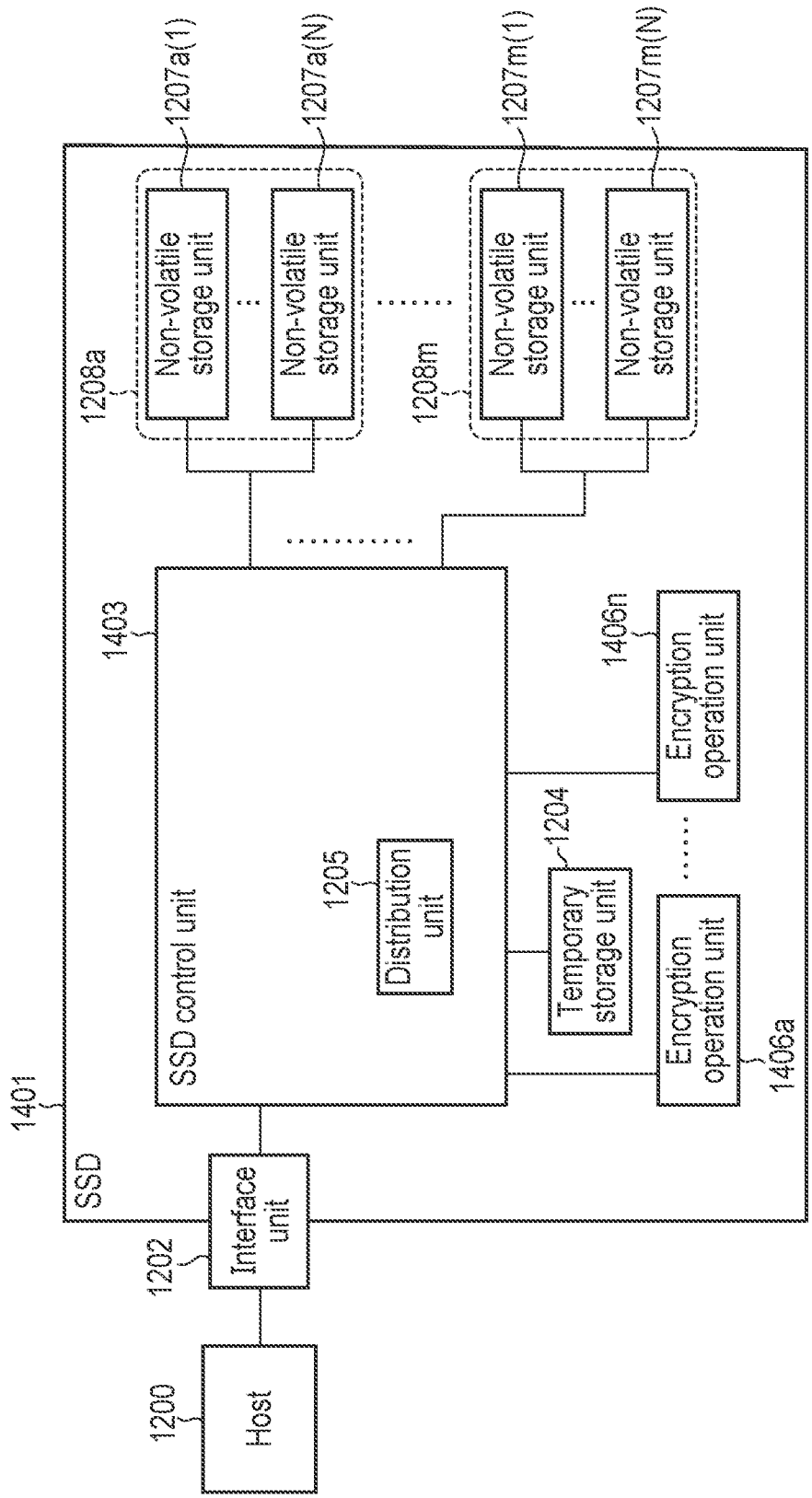
F I G. 14

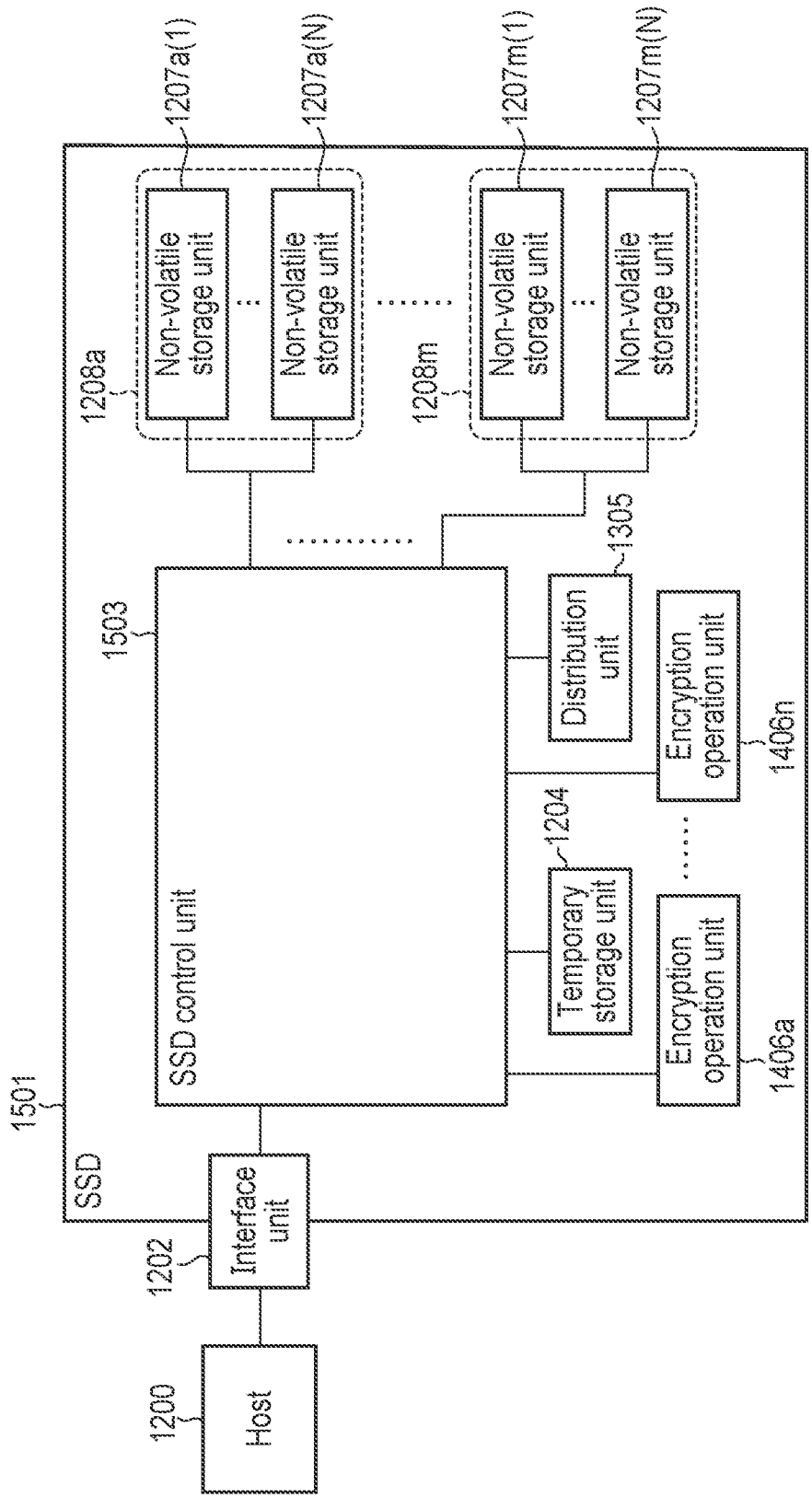
F I G. 15

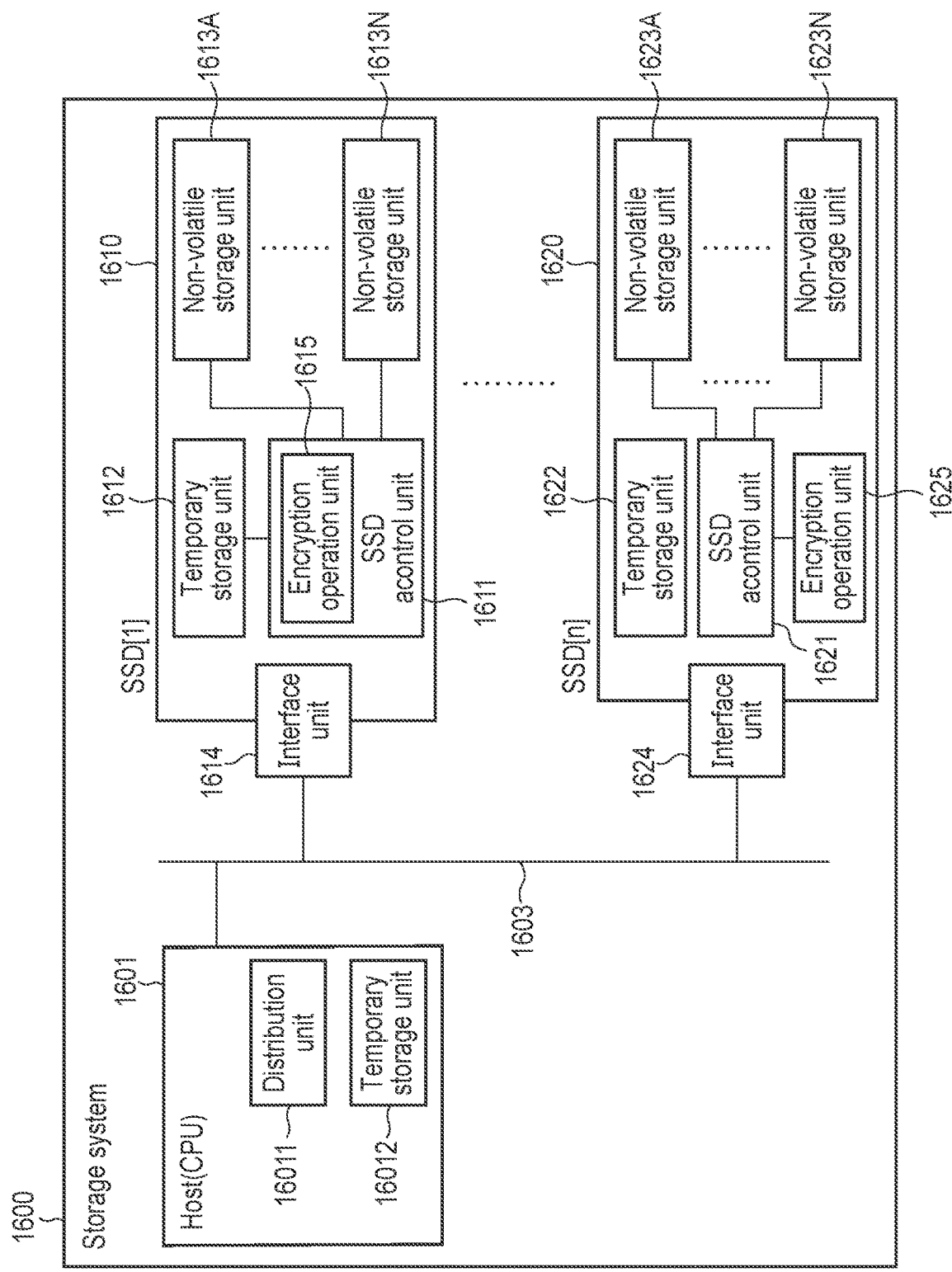
F I G. 16

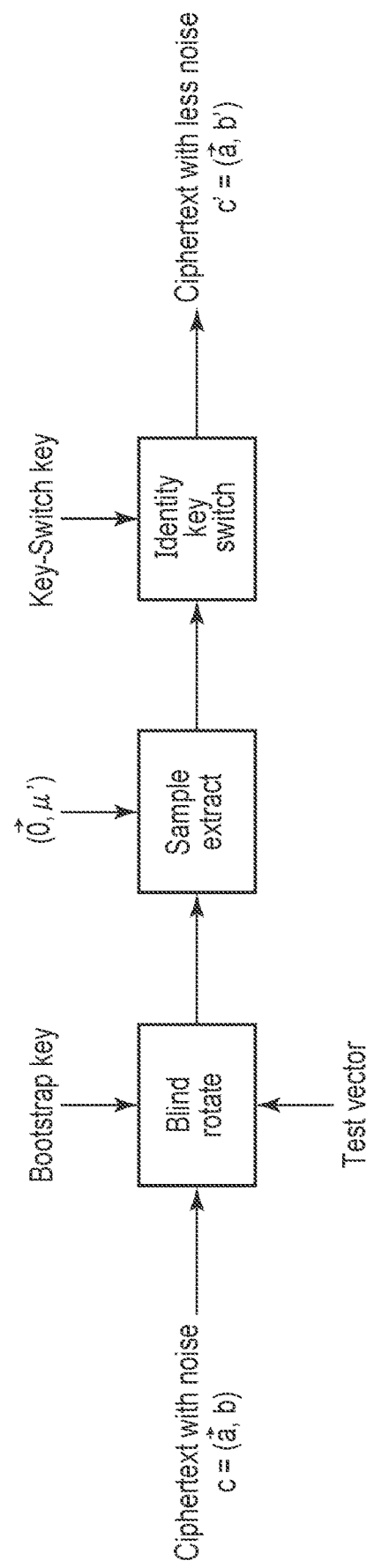
F I G. 17

INFORMATION STORAGE DEVICE AND INFORMATION STORAGE SYSTEM

CROSS-REFERENCE TO RELATED APPLICATIONS

This application is based upon and claims the benefit of priority from Japanese Patent Applications No. 2022-017381, filed Feb. 7, 2022, the entire contents of which are incorporated herein by reference.

FIELD

Embodiments described herein relate generally to an information storage device and an information storage system.

BACKGROUND

There are disclosed cloud compute devices that are equipped with an HE processor that performs processing related to homomorphic encryption. For HE processors, there is known a technique in which to perform various types of deformation processing in order to generate an operand for an instruction, and implement efficient processing by a plurality of processing units (compute engines).

In this prior art, the HE processor needs to exchange a large amount of data with a data storage device and a memory, consuming a wide bus bandwidth.

BRIEF DESCRIPTION OF THE DRAWINGS

FIG. 1 is a diagram illustrating a configuration of a storage system of a first embodiment.

FIG. 2 is a schematic diagram related to a series of division processes assuming that the number of SSDs in the storage system of the first embodiment is two.

FIG. 3 is a diagram illustrating an example of holding results of division and distribution of information requested to be stored by a host in the storage system of the first embodiment.

FIG. 8 is a diagram illustrating an example of a case where a series of correspondence relationships is stored in a temporary storage unit in the storage system of the first embodiment.

FIG. 12 is a functional block diagram of a storage system of a fourth embodiment.

FIG. 13 is a functional block diagram of a first modification of the storage system of the fourth embodiment.

FIG. 14 is a functional block diagram of a second modification of the storage system of the fourth embodiment.

FIG. 15 is a functional block diagram of a third modification of the storage system of the fourth embodiment.

FIG. 16 is a functional block diagram of a storage system of a fifth embodiment.

FIG. 17 is a diagram illustrating an overall flow related to reuse processing (bootstrap processing) in a case where a homomorphic encryption scheme to be used is CGGI (TFHE) in the storage system of each embodiment.

DETAILED DESCRIPTION

Figure 4:
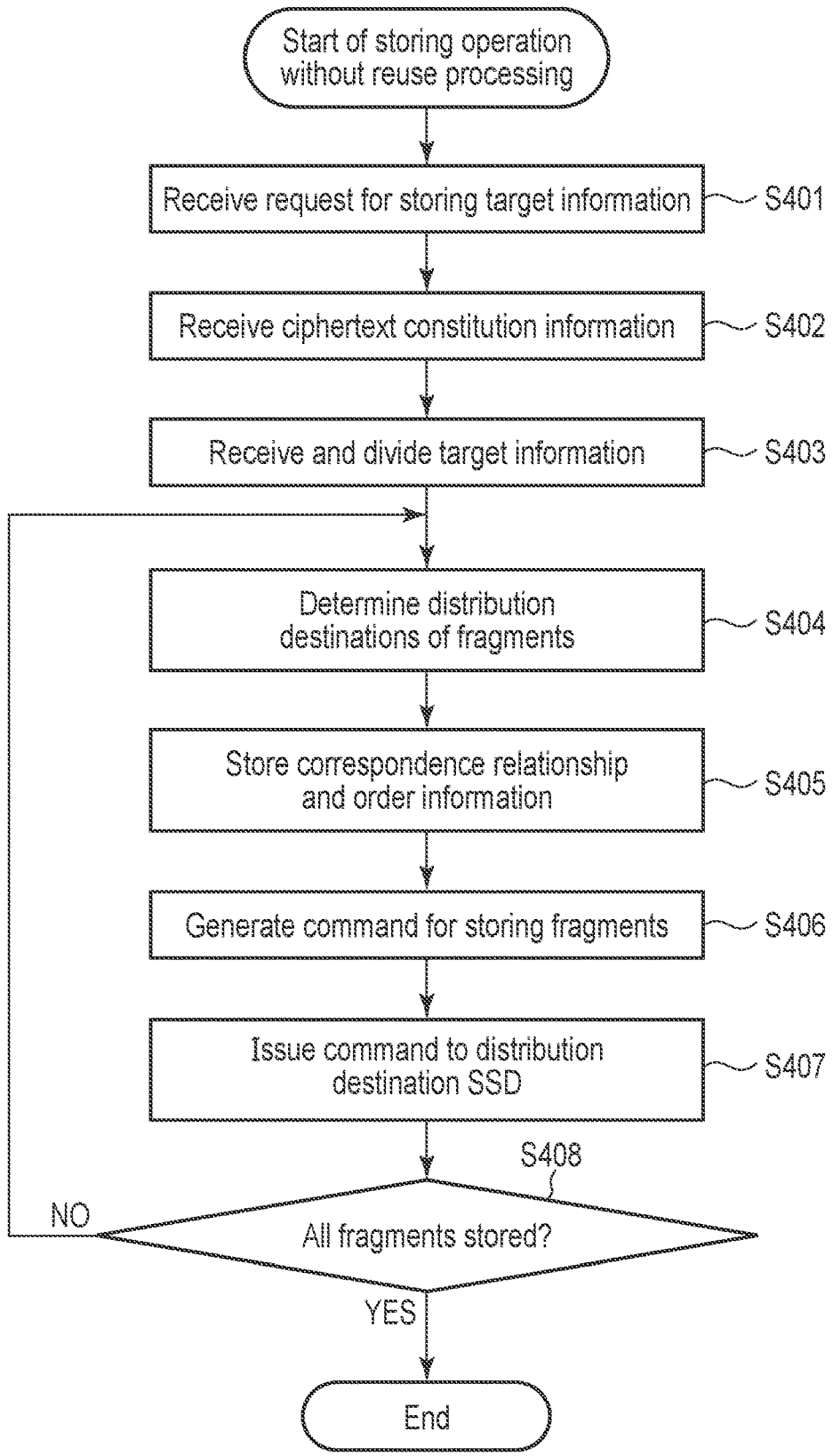
FIG. 4 is a flowchart illustrating a series of operations of holding results of division and distribution of information requested to be stored by the host in the storage system of the first embodiment.

Embodiments will be described hereinafter with reference to the accompanying drawings.

In general, according to one embodiment, an information storage device divides and stores a set of first ciphertext fragments into a plurality of storage units. The set of the first ciphertext fragments is generated by dividing first ciphertext that is encrypted with a first key and is capable of at least one type of operation of addition or multiplication without decryption. The information storage device includes a distribution unit and a temporary storage unit. The distribution unit receives a first identifier, constitution information, a second key, and a deformation command. The first identifier specifies an address of the information storage device of the first ciphertext. The constitution information specifies a constitution of the first ciphertext. The second key is used for deforming the first ciphertext. The deformation command uses a second key for the first ciphertext. The distribution unit generates or specifies the set of the first ciphertext fragments based on the first identifier and the constitution information. The distribution unit generates a deformation command to deform at least one fragment belonging to the set of the first ciphertext fragments using the second key. The distribution unit allocates the deformation command to at least one of the storage units as a destination storage unit for the first ciphertext fragment. The temporary storage unit holds the first identifier, an address of the information storage device of each of the first ciphertext fragments determined by the distribution unit, and an order which the first ciphertext is divided into fragments. The storage unit includes a non-volatile storage unit, a control unit, and an encryption processing unit. The non-volatile storage unit holds information. The control unit controls reading/writing of information from/to the non-volatile storage unit. The encryption processing unit deforms the first ciphertext fragment by using the second key based on the deformation command. The encryption processing unit stores a second ciphertext fragment as a result of the deformation in the non-volatile storage unit by requesting from the control unit instead of the first ciphertext fragment, or outputs the second ciphertext fragment as a read result.

First Embodiment (Basic Processing)

FIG. 1 illustrates a configuration of a storage system according to a first embodiment. The storage system 100 includes a host 101 that executes an application or the like, and a storage device 102 that includes a solid state drive (SSD) or a hard disk that stores information. The two are connected via an interface unit 103 included in the storage device 102. The methods of connecting and configuring components illustrated here are merely examples, and are not limited to the described methods.
(Components and Description Thereof)

The connection with the host is made via the interface unit 103, which leads to a control unit 104 that controls the operation of the storage device 102. The control unit 104 receives a command from the host and performs a process (for example, reading or writing) according to the command. The temporary storage unit 105 is a storage unit that is used by the control unit 104 as a buffer in exchanging data with the host or used by the control unit 104 for temporarily storing programs and data to be executed. For example, the temporary storage unit 105 can be a semiconductor memory such as a DRAM. Alternatively, the temporary storage unit 105 may be a non-volatile semiconductor memory such as an MRAM.

The control unit 104 includes a distribution unit 106 therein. The distribution unit 106 distributes the processing notification of which is provided by the host among the SSD[1] 110(1) to SSD[n] 110(n) which are storage devices in the storage apparatus 102 in consideration of the contents of the processing, characteristics of information to be processed, a storing state, and the like. The specific processing will be described later.

The SSD[1] 110(1) to SSD[n] 110(n) are basically storage devices having the same configuration. Each of the storage device includes an SSD control unit 111(1) that controls the operation of the SSD 110(1), an encryption operation unit 112(1) that performs an encryption-related operation to inside the SSD control unit 111(1), a temporary storage unit 113(1) used in a program or the like running in the SSD control unit 111(1) for the purpose of buffering or the like, and non-volatile storage units 114(1) A to 114(1)N used for storing permanent information. Although there are other small internal components, description of them are omitted because they do not affect the content of the present invention.
(Storing of Information without Reuse Processing)

First, a write operation without reuse processing of ciphertext of the homomorphic encryption will be described with reference to the schematic diagrams of FIG. 2. In the following description, it is assumed that the ciphertext of homomorphic encryption for one bit of plaintext is decompressed into M bits, but the ciphertexts may not have the same length depending on the encoding method of the ciphertext. The specific value of M varies depending on the encryption algorithm or encryption parameter used, but the basic operation does not change.

When storing the ciphertext, the host delivers information indicating that the content to be stored is ciphertext and including a cipher algorithm, a cipher parameter, and the like with which the constitution of the ciphertext can be specified (hereinafter, ciphertext constitution information) together with an I/O command for storing. For the delivery of the ciphertext constitution information, for example, a metadata field can be used in a case where NVMe is used as the I/O command. Instead, a dedicated command may be prepared and delivered in association with the I/O command. At that time, the I/O command and the command delivering the ciphertext constitution information may be associated with each other in the form of a FUSED command of NVMe. Otherwise a dedicated command different from the I/O command may be prepared and delivered separately from the I/O command group. In any case, the control unit 104 of the storage device 102 receives a structure of information to be stored.

The ciphertext constitution information received by the control unit 104 is passed to the distribution unit 106. The distribution unit 106 determines a method of dividing and distributing the information to be stored in the SSD based on its content. For example, when it is determined from the ciphertext constitution information that it is necessary to apply reuse processing in units of L bits of plaintext, the control unit 104 divides and stores the storing information by a multiple length of the LM bits. At this time, the number of divisions is a multiple of the number of SSDs. Then, the control unit 104 requests the SSDs to store corresponding generated fragments. Here, in the case of dividing the information to a larger number of fragments than the number of the SSD, the control unit 104 may allocate the fragments such that each SSD is continuously accessed or the SSDs are alternately accessed.

FIG. 2 is a schematic diagrams related to a series of division processes on the assumption that the number of SSDs is two. In this diagram, divided portions of ciphertext are described as fragment 1 to fragment 2m. Each fragment has a length of an integer multiple of LM bits. If the number of divisions is 2 (if the number of divisions is equal to the number of SSDs) (FIG. 2: 201), the fragments are distributed such that the fragment 1 is stored in the SSD[1] and the fragment 2 is stored in the SSD[2]. If the number of divisions is 2m and the distribution method is continuous (if the information is to be divided into an integer multiple of the number of SSDs and continuous fragments are allocated to the same SSD) (FIG. 2: 202), the fragments are distributed such that fragments 1 to m are stored in the SSD[1] and fragments m+1 to 2m are stored in the SSD[2]. In this case, although the state after storing is the same as the case where the number of divisions is 2, the appropriate SSD may be selected according to how the SSD[1] and SSD[2] are controlled by the control unit 104 (for example, the former method can reduce the number of instructions to the SSD than the latter method, with a possibility that the overhead associated with storing is small). If the number of divisions is 2m and the distribution method is alternate (if the information is divided into an integral multiple of the number of SSDs and consecutive fragments are allocated to different SSDs) (FIG. 2: 203), the fragments are distributed such that the fragment 1, the fragment 3, . . . , are stored in the SSD[1] and the fragment 2, the fragment 4, . . . , are stored in the SSD[2]. When the number of divisions is 2m and four fragments are collectively stored (if the information is divided into an integral multiple of the number of SSDs and four consecutive fragments are aggregated in one SSD) (FIG. 2: 204), the fragments are distributed such that the fragments 1 to 4, the fragments 9 to 12, . . . , are stored in the SSD[1] and the fragment 5 to 8, the fragment 13 to 16, . . . , are stored in the SSD[2]. The divisions and distributions described here are examples, and may be realized by any other division and distribution method as long as it is based on the application unit size (LM bits) of the reuse processing.

In the division and distribution examples described above, fragments are equally distributed to the SSDs. However, the division and distribution may be intentionally adjusted such that deviation occurs according to the free capacities or the use situation of the SSDs. For example, the number of fragments allocated to an SSD having a small free capacity is decreased, and the number of fragments allocated to an SSD having a large free capacity is increased. The ratio of the number of fragments to be allocated may be a predetermined ratio or a ratio according to the ratio of the free capacity. Similarly, in a case where the number of executions of the reuse processing or the number of executions of I/O can be determined for each SSD as the usage condition, the number of fragments to be allocated may be changed according to the number of executions of the reuse processing and the number of executions of I/O. For example, fragments may be allocated according to the ratio of inverse of the number of executions of the reuse processing for each SSD. In the case of collectively distributing and storing a plurality of fragments, the units of distribution and storing may be varied according to the free capacity or the usage condition. That is, two fragments each may be distributed to and stored in an SSD having a small free capacity, and four fragments each may be distributed to and stored in an SSD having a large free capacity.

The distribution unit 106 may determine a division/distribution method and the control unit 104 may perform actual division processing and distribution processing, or the distribution unit 106 may perform actual division processing and distribution processing. At that time, the distribution unit 106 may perform only division and distribution processing on the ciphertext of the homomorphic encryption, or may perform division and distribution processing on general information such as RAID, for example.

As described above, in the storage device 102, since the information requested to be stored by the host is divided and distributed to the SSDs, it is necessary to hold the correspondence relationship between the storage location of I/O viewed from the host and the location where I/O is actually stored, together with the information on the order of the fragments. This information may be held and managed in the temporary storage unit 105 by a component that performs division and distribution processing. An example will be taken with reference to FIG. 3. In this example, the host requests writing to the location specified by addr1, divides the written information, and holds the correspondence relationship in which fragments of the information are stored in the corresponding storage destination SSDs at storage destination addresses (for example, the first fragment is stored in the SSD 1 at addr1-1, and the second fragment is stored in the SSD 2 at addr1-2).

When the division/distribution correspondence relationship is stored in the temporary storage unit 105, all storage destinations corresponding to all identifiers managed by the host 101 may be managed, or may be managed in units of reuse processing (LM bits in this case). In addition, the actual storage locations may be managed in association with the corresponding identifiers for the heads of the stored fragments and the lengths thereof. Furthermore, in a case where the method of division and distribution by the control unit 104 is implemented as an algorithm by which the storage destination can be uniquely determined from the ciphertext constitution information and the identifier managed by the host 101 (for example, the storage destination can be derived by applying a hash function to the ciphertext constitution information and the identifier), the correspondence relationship may be substituted by the identifier of the algorithm and management data for managing hash collision.

FIG. 4 is a flowchart illustrating an operation of storing information without reuse processing in the storage system of the present embodiment.

First, the control unit 104 receives a request for storing target information (step S401). The target information is ciphertext of homomorphic encryption requiring reuse processing, but it is not possible to specify what kind of ciphertext the target information is. Therefore, the control unit 104 receives, from the host 101, ciphertext constitution information specifying what kind of ciphertext the target information is (step S402). After receiving these commands, the control unit 104 receives the target information itself to be stored and divides the target information (step S403). In this state, the information necessary for the reuse processing is prepared.

After determining the division and distribution destination of the target information, the control unit 104 updates the correspondence relationship in the storage device 102 (step S405). The control unit 104 generates a command for storing the fragments in the SSD[1] to SSD[n] (110(1) to 110(*n*)) (step S406), and issues the command to the corresponding SSD (step S407). After issuing the command for all the fragments (YES in step S408), the control unit 104 ends the operation. When there is any fragment for which a command has not been issued (step S408: NO), the control unit 104 repeats the processing from step S404.

In this flowchart, the processing from the determination of the distribution destinations to the issuance of the save command is described to be continuously executed for each fragment, but another sequence may be used. For example, the distribution destinations may be determined for all the fragments first, the correspondence relationship may be stored, and then generation and issuance of the storage command may be repeated for each fragment.

In the present embodiment, the ciphertext corresponding to the same bits of the plaintext is distributed to the same SSD, but the fragments may be further divided and distributed to the different SSD. At that time, only a part of the reuse processing may be executed to complete the processing, and the remaining processing may be performed by the control unit, or the remaining processing may be resumed after being aggregated into one SSD using an aggregation function described in relation to a second embodiment.

(Reading of Information without Reuse Processing)

Next, a read operation corresponding to a write operation without reuse processing of ciphertext of the homomorphic encryption will be described. As described above, the ciphertext is divided and stored in a plurality of SSDs, and the correspondence relationship between the storage location recognized by the host and the actual storage location is managed by the temporary storage unit 105. Based on this premise, in the read operation, the control unit 104 issues a read command to each SSD with reference to the correspondence relationship, rearranges the read fragments in an appropriate order, and outputs the rearranged fragments to the host 101 via the I/F unit 103.

Figure 5:
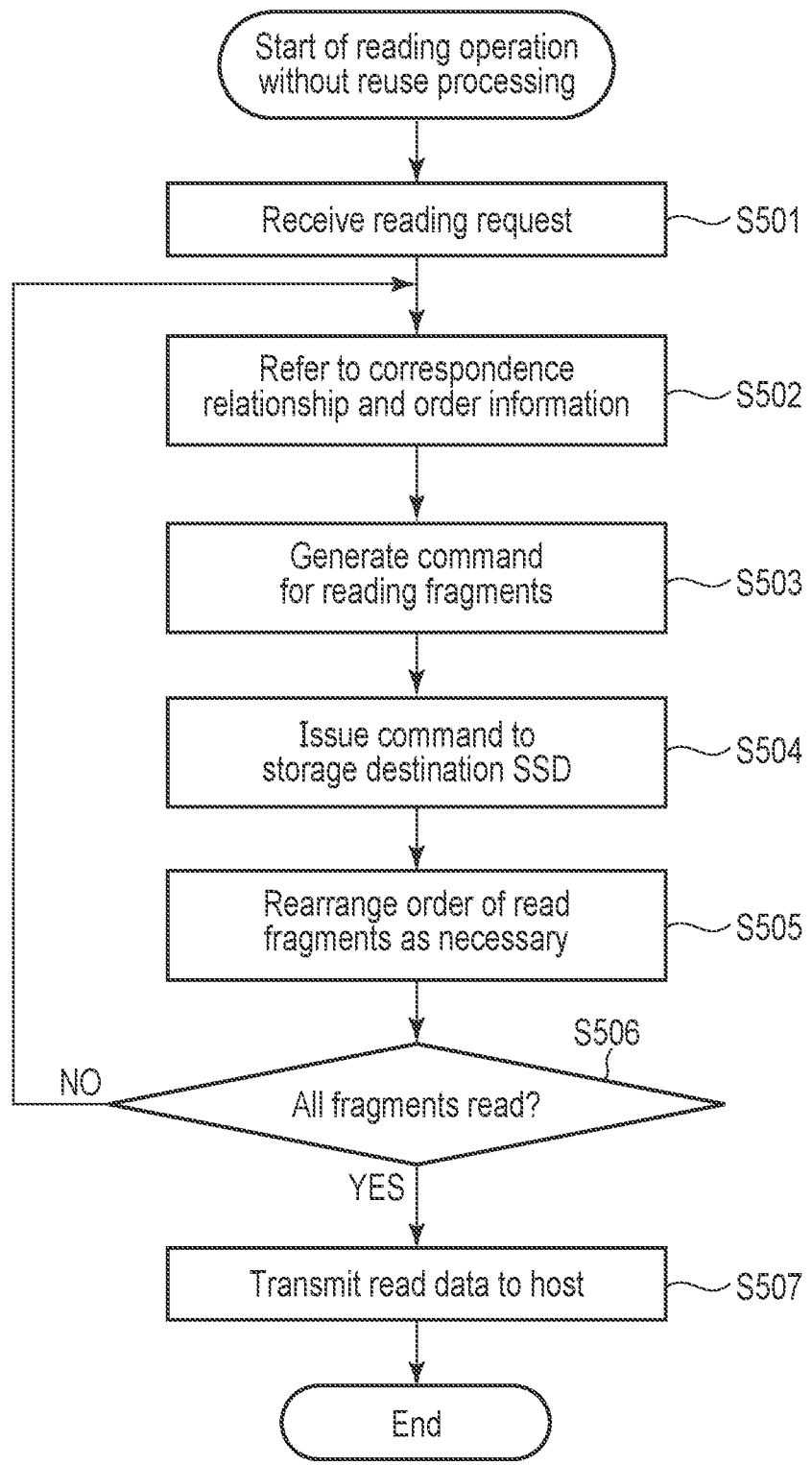
FIG. 5 is a flowchart illustrating a read operation corresponding to a write operation without reuse processing of ciphertext of homomorphic encryption in the storage system of the first embodiment.

FIG. 5 is a flowchart illustrating an operation of reading information without reuse processing in the storage system of the present embodiment.

First, the control unit 104 receives a request for reading target information (step S501). The control unit 104 refers to the correspondence relationship in the storage device 102 regarding the distribution destination of the target information (step S502). The control unit 104 generates a command for reading fragments from the SSD[1] to SSD[n] (110(1) to (110(n))) (step S503), and issues the command to the corresponding SSD (step S504). The control unit 104 rearranges the order of the read fragments as necessary (step S505). When issuing the command for all the fragments (YES in step S506), the control unit 104 transmits the read data to the host 101 (step S507), and ends the operation. When there is any fragment for which a command has not been issued (step S506: NO), the control unit 104 repeats the processing from step S502.

(Case of Storing Ciphertext of Homomorphic Encryption with Reuse Processing)

Figure 6:
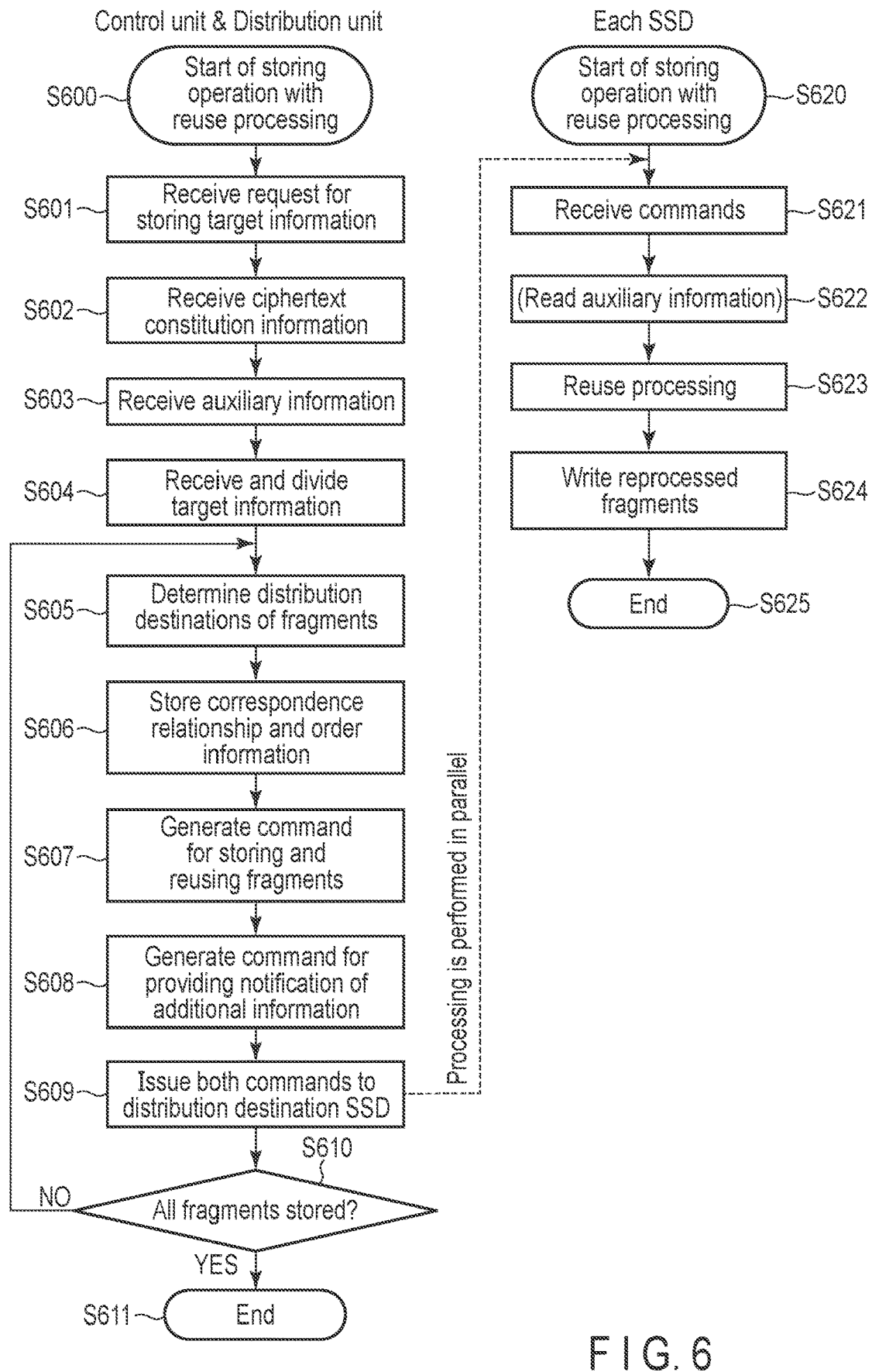
FIG. 6 is a flowchart illustrating a flow of processing in a case of storing ciphertext of homomorphic encryption involving reuse processing in the storage system of the first embodiment.

Processing of storing ciphertext of homomorphic encryption with reuse processing will be described. FIG. 6 is a flowchart illustrating an operation of storing the ciphertext of the homomorphic encryption with reuse processing in the storage system of the present embodiment. The basic operation conforms to the above-described case without reuse processing.

First, a request for storing target information is received (step S601). The target information is ciphertext of homomorphic encryption requiring reuse processing, but it is not possible to specify what kind of ciphertext the target information is. Therefore, received from the host 101 is ciphertext constitution information specifying what kind of ciphertext the target information is (step S602). Further, auxiliary information necessary for the reuse processing is received together with the constitution of the ciphertext (step S603). Following the reception of these commands, the target information itself to be stored is received, and the target information is divided in the same manner as in the case above-described case without reuse processing (step S604). In this state, the information necessary for the reuse processing is prepared.

The auxiliary information received in step S603 may be received only when the same information is not stored in the SSD. For example, when the storage device 102 detects that the data is not stored, the host 101 may be notified of the detection, and the host 101 may provide auxiliary information to the storage device 102 correspondingly.

In any case, after the division and distribution destination of the target information are determined, the correspondence relationship in the storage device 102 is updated (step S606). Then, command for storing fragments in the SSD[1] to SSD[n] (110(1) to (110(n))) and command for providing additional information including ciphertext information and auxiliary information are generated (steps S607 and S608), and are issued to the corresponding SSD (step S609). When the commands are issued for all the fragments (YES in step S610), the operations of the control unit 104 and the distribution unit 106 in the storage device 102 are ended (step S611). When there is any fragment for which a command has not been issued (step S610: NO), the processing from step S605 is repeated.

In this flowchart, the determination of the distribution destinations (step S605) to the issuance of the commands (step S609) are continuously executed. However, processing may be performed in parallel as appropriate according to the number of SSDs included in the storage device 102.

Each SSD that has received the commands from the control unit 104 and the distribution unit 106 in step S609 performs reuse processing and write processing. When commands are received (step S621), if necessary auxiliary information is stored in the SSD, the auxiliary information is read (step S622). At this time, if there is no auxiliary information, the host 101 is notified via the control unit 104 as described above (not illustrated).

When all the information necessary for the reuse processing is prepared, the reuse processing is performed (step S623). The details of this step vary depending on the algorithm used in the reuse processing, but basically, mathematical processing is performed to reduce the amount of noise (information that causes a problem when further calculation is performed without decryption) from the ciphertext an instruction of which for writing is given. This processing is performed by an SSD control unit (for example, 111(1)) or an encryption operation unit (for example, 112(1)) in the SSD control unit. Although intermediate data is generated in the middle of the processing, the intermediate data is temporarily held in a temporary storage unit (for example, 113(1)) in the SSD or held in a non-volatile storage unit (for example, any one of 114(1) A to N). The data with reduced noise finally generated by the SSD control unit or the encryption operation unit is stored in the location specified by the control unit 104 under the instruction from the SSD control unit (step S624). The SSD control unit may have a function of changing the location where to hold data in the non-volatile storage unit inside the SSD, without using the location specified by the control unit 104. In that case, the SSD control unit maintains the correspondence relationship.

If the target of the write instruction is constituted by a plurality of units of reuse processing (for example, if a plurality of fragments is collectively stored as in illustrated in FIG. 2(B), 202 and 204), the reuse processing for each fragment may be executed in an arbitrary order. Furthermore, if the encryption operation unit is capable of simultaneously executing a plurality of reuse processes, the plurality of reuse processes may be simultaneously executed. For example, if the target of one write instruction includes a plurality of units of reuse processing, the plurality of units of reuse processing may be simultaneously processed.

The above is the operation related to writing with reuse processing.

(Case of Reading Ciphertext of Homomorphic Encryption with Reuse Processing)

Figure 7:
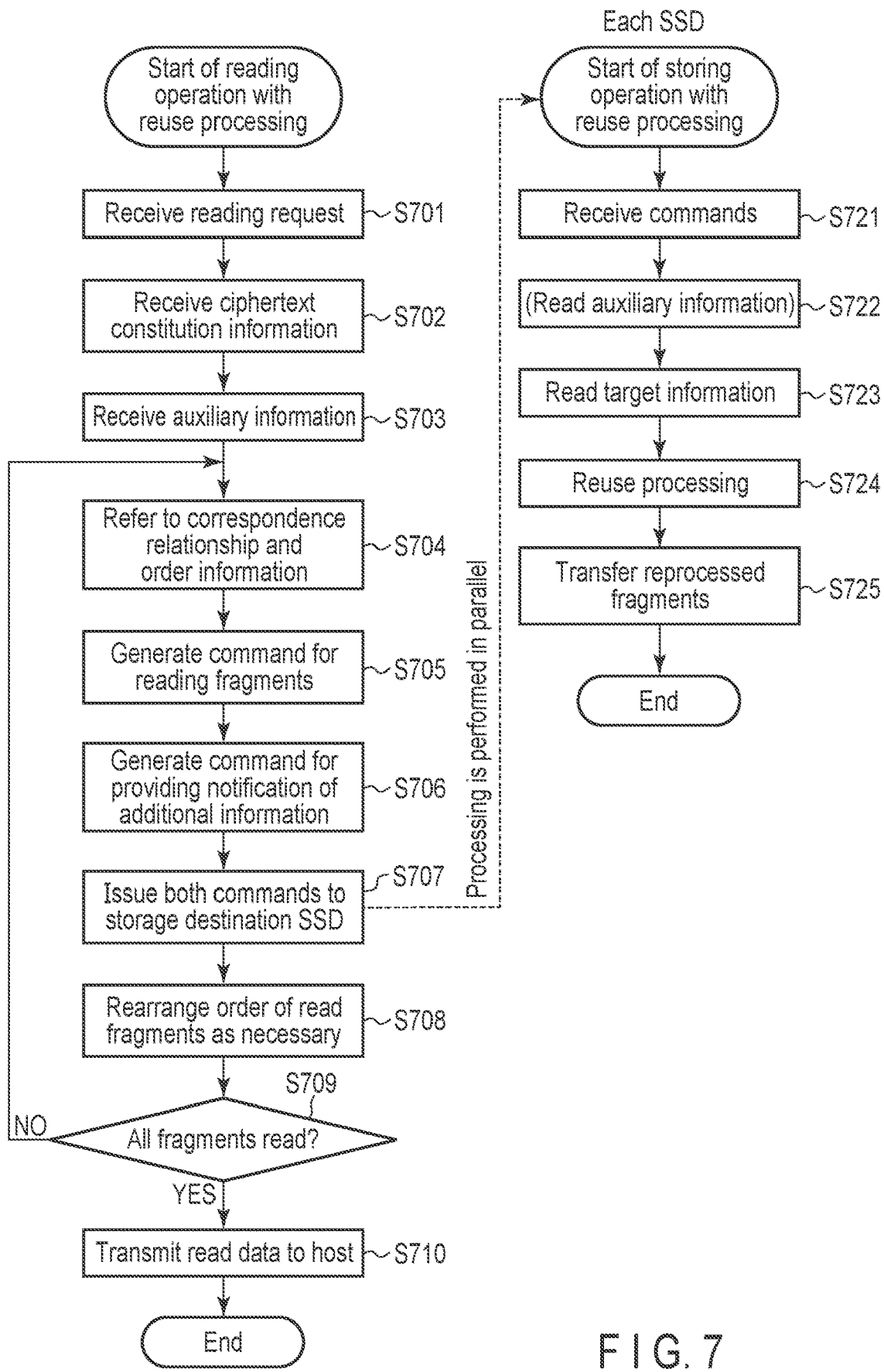
FIG. 7 is a flowchart illustrating another flow of processing in a case of storing ciphertext of homomorphic encryption involving reuse processing in the storage system of the first embodiment.

The reuse processing may be performed not only when the ciphertext is stored but also when the host 101 reads the ciphertext. FIG. 7 is a flowchart illustrating an operation of reading the ciphertext of the homomorphic encryption with reuse processing in the storage system of the present embodiment.

First, the control unit 104 receives a request for reading target information (step S701). The target information is ciphertext of homomorphic encryption requiring reuse processing, but it is not possible to specify what kind of ciphertext the target information is. Therefore, the control unit 104 receives, from the host 101, ciphertext constitution information specifying what kind of ciphertext the target information is (step S702). Further, the control unit 104 receives the constitution of the ciphertext and the auxiliary information necessary for the reuse processing (step S703).

Next, the control unit 104 refers to the correspondence relationship in the storage device 102 regarding the distribution destination of the target information (step S704). The control unit 104 generates a command for reading fragments from the SSD[1] to SSD[n] (110(1) to (110(n))), and a command for providing additional information including ciphertext information and auxiliary information (steps S705 and S706), and issues the commands to the corresponding SSD (step S707). The control unit 104 rearranges the order of the read fragments as necessary (step S708). When issuing the commands for all the fragments (YES in step S709), the control unit 104 transmits the read data to the host 101 (step S710), and ends the operation. When there is any fragment for which a command has not been issued (step S709: NO), the control unit 104 repeats the processing from step S704.

Each SSD that has received the commands issued in step S707 performs reuse processing and read processing. When commands are received (step S721), if necessary auxiliary information is stored in the SSD, the SSD reads the auxiliary information (step S722). In addition, the SSD reads the target information (step S723).

When all the information necessary for the reuse processing is prepared, the SSD performs the reuse processing (step S724). The SSD transfers the data with reduced noise generated by the reuse processing to the control unit 104 (step S725).

As illustrated in this diagram, the data in which the amount of noise has decreased is not re-stored in the SSD. The host 101 needs to separately instruct the storage apparatus 102 to store the data in which the amount of noise has decreased. The data simply reciprocates between the host 101 and the storage device 102, and the effect of the present invention cannot be sufficiently utilized. However, in a case where priority is given to the possibility of reuse, load reduction at the time of storing, and the like, this method may be utilized.

Information indicating whether each fragment has been subjected to the reuse processing may be stored in the non-volatile storage unit together with the target information as metadata, or may be held by adding a field to the correspondence table in the temporary storage unit. At that time, not only whether the entire ciphertext before the division has been subjected to the reuse processing is managed, but also whether each of fragments has been subjected to the reuse processing may be managed. In this way, the execution of the reuse processing can be temporarily delayed in the SSD in which the load has temporarily increased at the time of writing, information before the reuse processing can be temporarily written and processed after decrease of the load, or the reuse processing can be changed to be performed at the time of reading. In addition, if auxiliary information necessary for the reuse processing is held in the SSDs, associating the above-mentioned information with the auxiliary information makes it possible to execute the reuse processing like batch processing independent of the timing of write/read requests from the host. FIG. 8 illustrates an example in which whether each fragment has been subjected to reuse processing is managed by the temporary storage unit. FIG. 8(A) illustrates an example in which information indicating whether each fragment has been subjected to the reuse processing is held by adding a field to the correspondence table in the temporary storage unit. FIG. 8(B) illustrates an example in which the auxiliary information necessary for the reuse processing held in the SSDs is associated with the correspondence table in the temporary storage unit.

Further, when one read command is intended to read a fragment including a plurality of units of reuse processing, the reuse processing may be executed in an arbitrary order of the units of reuse processing included in the fragment. Furthermore, if the encryption operation unit is capable of simultaneously executing a plurality of reuse processes, the plurality of reuse processes may be simultaneously executed. The order generated by the division is maintained until a response is finally returned to the host 101.

(Reception and Utilization of Distribution Destination Determination Support Information Regarding Division and Distribution)

In the present embodiment, the ciphertext is divided and distributed using the ciphertext constitution information indicating the constitution of the ciphertext. Alternatively, distribution destination determination support information for determining the distribution destinations may be added to the ciphertext constitution information, and the distribution unit may determine the distribution destinations using the distribution destination determination support information. For example, it is assumed that the control unit 104 has only a function of measuring a simple usage situation for each SSD, and the host 101 has a function of collecting and analyzing the usage situation measured by the control unit 104 on a long-term basis. In that case, providing information for supporting determination of distribution destinations from the host 101 makes it possible to expect that the load and used capacity of reuse processing be smoothed for the long term.

As described above, in the present embodiment, when the host computer stores the information encrypted by the homomorphic encryption in the I/O processing process of the storage system that reads and writes the information based on the I/O commands, the host computer provides the information to be stored, the necessity of the processing for reuse, and the information related to the algorithm necessary for necessary reuse, and the host computer efficiently executes large-scale encryption-related processing based on the parallelism in consideration of the information to be stored and the characteristics of the algorithm.

Second Embodiment (Aggregating Data of Reuse Processing in Variation of First Embodiment A second embodiment is an extension of the first embodiment. In the first embodiment, the data having been subjected to the reuse processing is stored as it is in the SSDs that have executed the reuse processing. In the present embodiment, the data is aggregated in one SSD, and the aggregated data and storage destinations are associated with each other, so that continuous reading can be efficiently performed.

Figure 9:
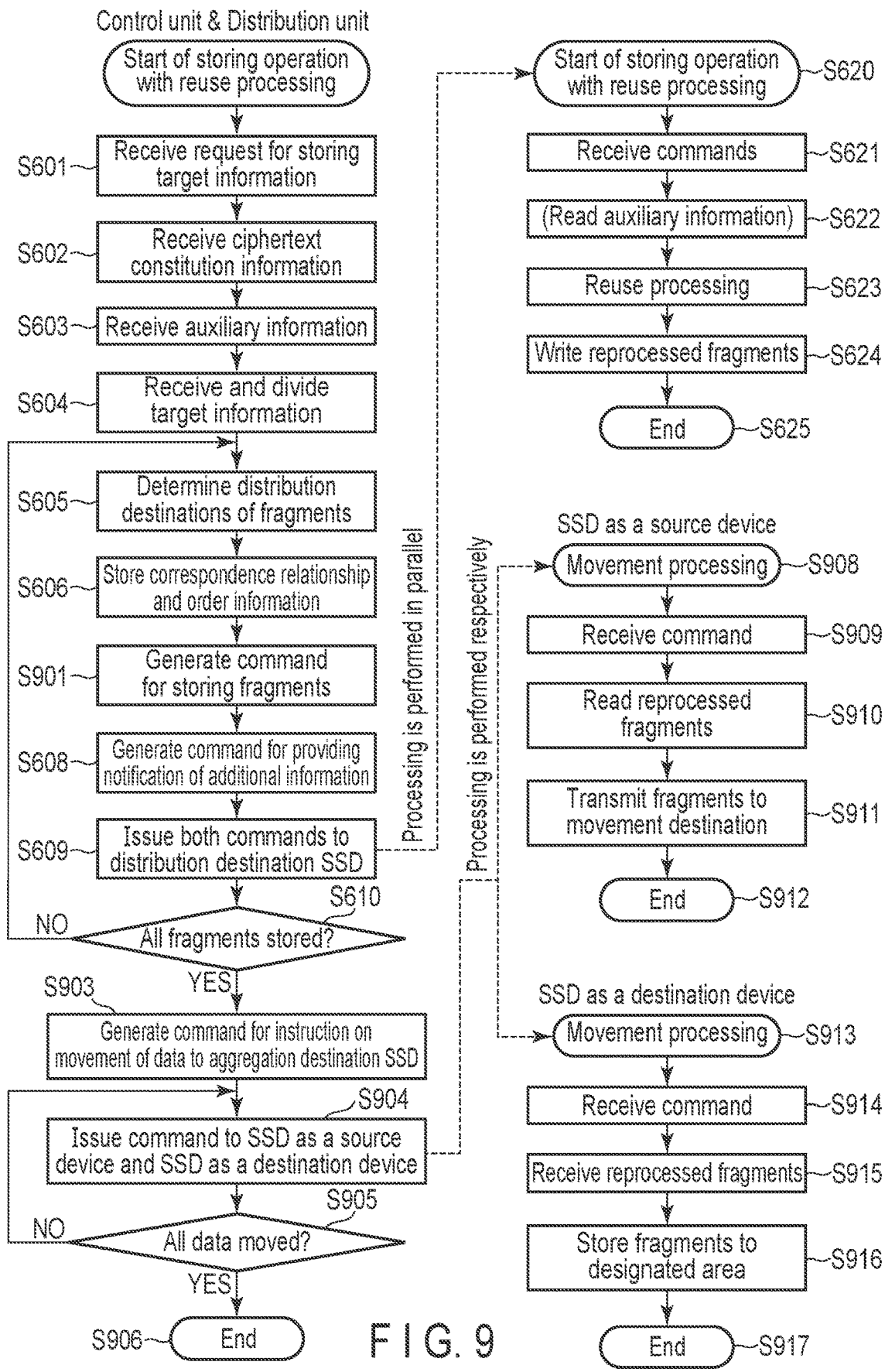
FIG. 9 is a diagram illustrating a sequence of operations in a write process involving reuse processing in the storage system of a second embodiment.

Since the configuration of the present embodiment is the same as that of the first embodiment, the description thereof will be omitted. FIG. 9 illustrates an operation sequence of write processing with reuse processing in the present embodiment. The basic sequence is the same as that illustrated in FIG. 6, and new numbers are assigned to different steps.

Figure 10:
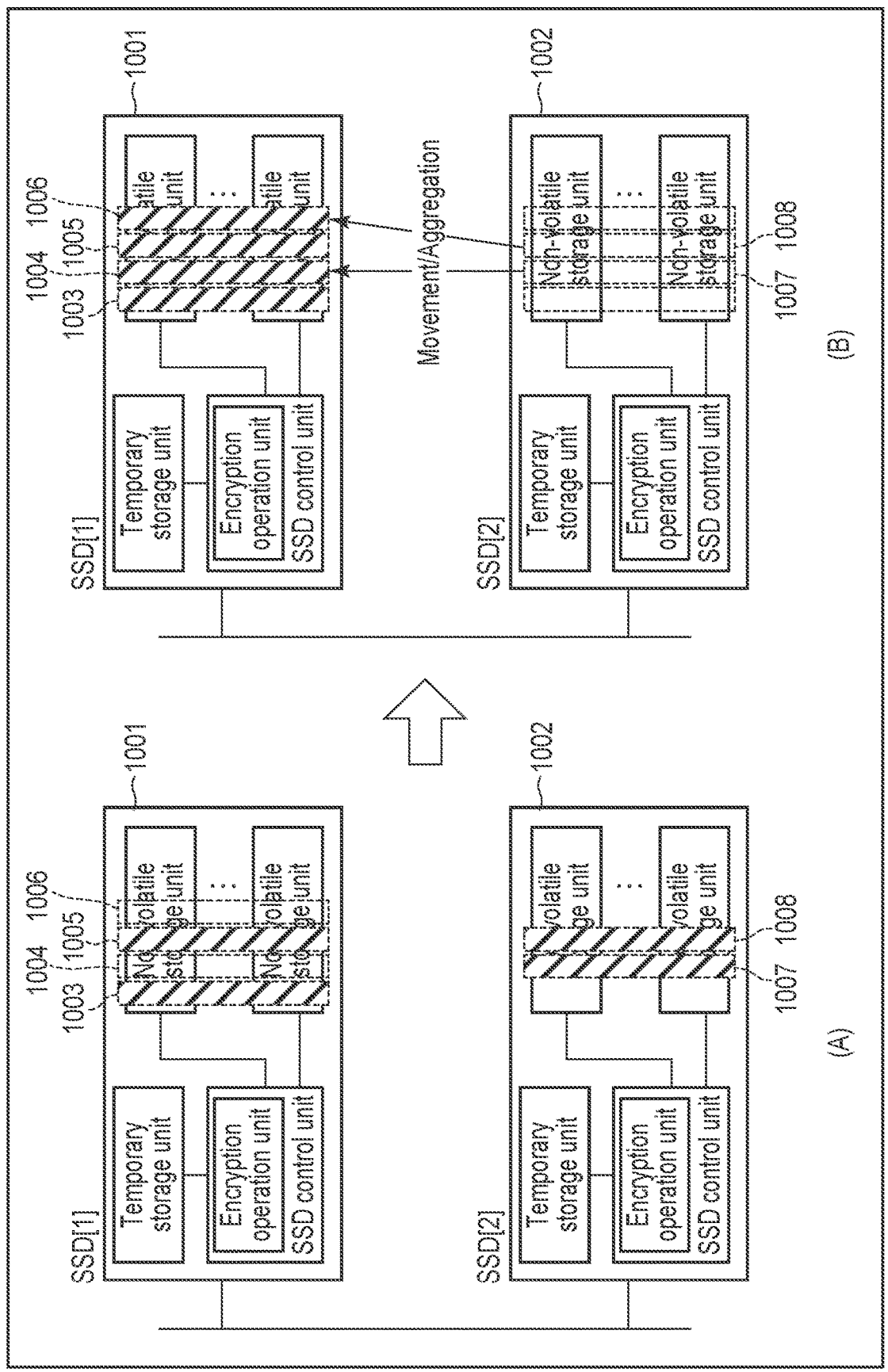
FIG. 10 is a schematic diagram related to a series of division processes assuming that the number of SSDs in a storage system of the second embodiment is two.

The first difference is step S901 of generating a command for instructing each SSD to perform storing with reuse processing. This command includes a physical address specifying a storage location. The address is written into the SSD to be the aggregation destination or is written into the other SSD. A physical address is set to the SSD to be the aggregation destination, in consideration of a space in which fragments reprocessed by the other SSD can be stored. An address of the free area is designated to the other SSD, without consideration given to this point. FIG. 10 is a schematic diagram. In this schematic diagram, it is assumed that reuse processing is performed in two SSDs (SSD[1] 1001 and SSD[2] 1002) in a distributed manner, and data after the reuse processing is aggregated in the SSD[1].

At the time of designation of the physical addresses of the storage destination in step S901, physical addresses are set such that data is stored in a region 1003 and a region 1005 of the SSD[1]. The space between the region 1003 and the region 1005 is reserved as a space for storing the data having been subjected to reuse processing in the SSD[2]. Since the data size after execution of the reuse processing does not depend on the target information, the size of the space to be kept free is determined when the target information is divided in step S604, so that the physical addresses can be appropriately set with the space in step S901. In this way, free spaces of the region 1004 and the region 1006 are secured. On the other hand, for the SSD[2] that is not the aggregation destination, physical addresses may be set such that the data is stored at arbitrary positions. In the example of FIG. 10, physical addresses are set so as to be stored in a region 1007 and a region 1008.

After all the data is distributed to the SSDs in step S610 and the reuse processing and storing are executed (YES in S610), commands for giving an instruction on movement of the data to the aggregation destination SSD are generated (step S903). In this step, a plurality of commands, not one command, is generated. That is, a command for the SSD as a source device and a command for the SSD as a destination device are generated. Further, the commands generated may be commands to be issued to the control unit 104 or the temporary storage unit 105 and to be stored in the SSD as a destination device after reading the movement target information, or may be commands to be directly moved (copied, to be exact) from the SSD as a source device to the SSD as a destination device (such commands can be realized using, for example, a controller memory buffer (CMB) function of NVMe). Further, a command for deleting unnecessary data after the reuse processing (or a command to invalidate the data) may also be generated to the SSD as a source device.

Next, the generated commands are issued to the SSD as a source device and the SSD as a destination device at appropriate timings (step S904). The control unit 104 issues the commands at appropriate timings so that writing to the SSD as a destination device does not occur at the same time. For example, the commands are issued so that the division and distribution target information is sequentially moved beginning from a fragment positioned at the head of the data.

Upon completion of the command issuance and data writing, the correspondence relationship held in the temporary storage unit 105 is updated so that the SSD as a source device will not be referred to when a new read request is received. This movement processing may be executed so as to be asynchronous to execution of other I/O processing. In that case, the control unit 104 may stop the processing once in step S903 in FIG. 9 and resume step S903 when the processing becomes executable.

Even when any command is generated, the SSD as a source device that has received the command executes the processing in steps S908 to S912 (reading the target information and transmitting the data to a designated address), and the SSD as a destination device executes the processing in steps S913 to S917 (storing data written to the predetermined address into a non-volatile storage unit at a designated physical address).

If the aggregation destination SSD is limited to one specific SSD, only the free space of the drive in the SSD decreases. Thus, the aggregation destination may be appropriately distributed among a plurality of SSDs. Round robin processing may be simply used based on identifiers given to the storage devices, hash values for (at least part of) the storage target information may be used, or SSDs satisfying conditions such as the largest free capacity or the smallest I/O load may be selected.

In the series of description, one aggregation destination SSD is used, but a plurality of SSDs smaller in number than the SSDs that have executed the reuse processing may be used as the aggregation destinations. That is, data aggregation may be performed such that the number of divisions is reduced with the expectation of achieving both high speed processing by distribution of reuse processing and performance improvement by simultaneous reading of processed information.

In addition, the non-volatile storage unit that stores the aggregated fragments (this storage unit may be an SSD in which the reuse processing has been executed or a dedicated SSD) may have characteristics in consideration of long-term storage, such as a slower writing speed, a lower number of acceptable write-erase cycle, and a larger capacity per unit area than those of the non-volatile storage unit to be used to store the data immediately after the reuse processing (this storage unit may be the non-volatile storage unit in the SSD that executes only the reuse processing or the non-volatile storage unit in the SSD as the aggregation destination). (Conversely, the region for temporarily storing data from immediately after the reuse processing to the aggregation may have characteristics suitable for temporary storing of information such as a high writing speed and high number of acceptable write-erase cycle.) In order to realize these characteristics, the SSD mounted in the storage device 102 may include a plurality of non-volatile storage units having different characteristics, or the non-volatile storage unit having one characteristic may be controlled by the control unit to exert a plurality of characteristics. The storage device 102 may have a plurality of SSDs having different characteristics for different purposes.

If the SSD that performs the reuse processing and is the aggregation destination includes a plurality of non-volatile storage units having different characteristics, a storage region may be directly designated as a storage destination of the deformation command, for long-term storing, not for temporary storing.

In the above description, the results of the completed reuse processing are stored in the non-volatile storage unit. However, if intermediate data generated during the reuse processing cannot be held in the temporary storage unit in the SSD, the intermediate data may be output to the non-volatile storage unit. Also in this case, a storage area having characteristics such as a higher writing speed and higher number of acceptable write-erase cycle than the area in the SSD storing the data after the reuse processing may be used.

Through the above operations, the state illustrated in FIG. 10(A) is changed to the state illustrated in FIG. 10(B). Aggregating the data after the reuse processing into one SSD in this manner makes it possible to read efficiently the data in a continuous manner when the data is necessary.

Third Embodiment (Aggregating Data of Reuse Processing in Variation of Second Embodiment: No. 2

A third embodiment is a further modification of the second embodiment. In the second embodiment, at the time of the reuse processing, a predetermined empty region is created in advance in the SSD as a destination device, and the data is moved from the other SSD as a source device to the region. In contrast, in the present embodiment, the data having been subjected to the reuse processing is also moved to the SSD as a destination device. Since the operation sequence in the present embodiment can be easily analogized from FIG. 9, description of details will be omitted.

Figure 11:
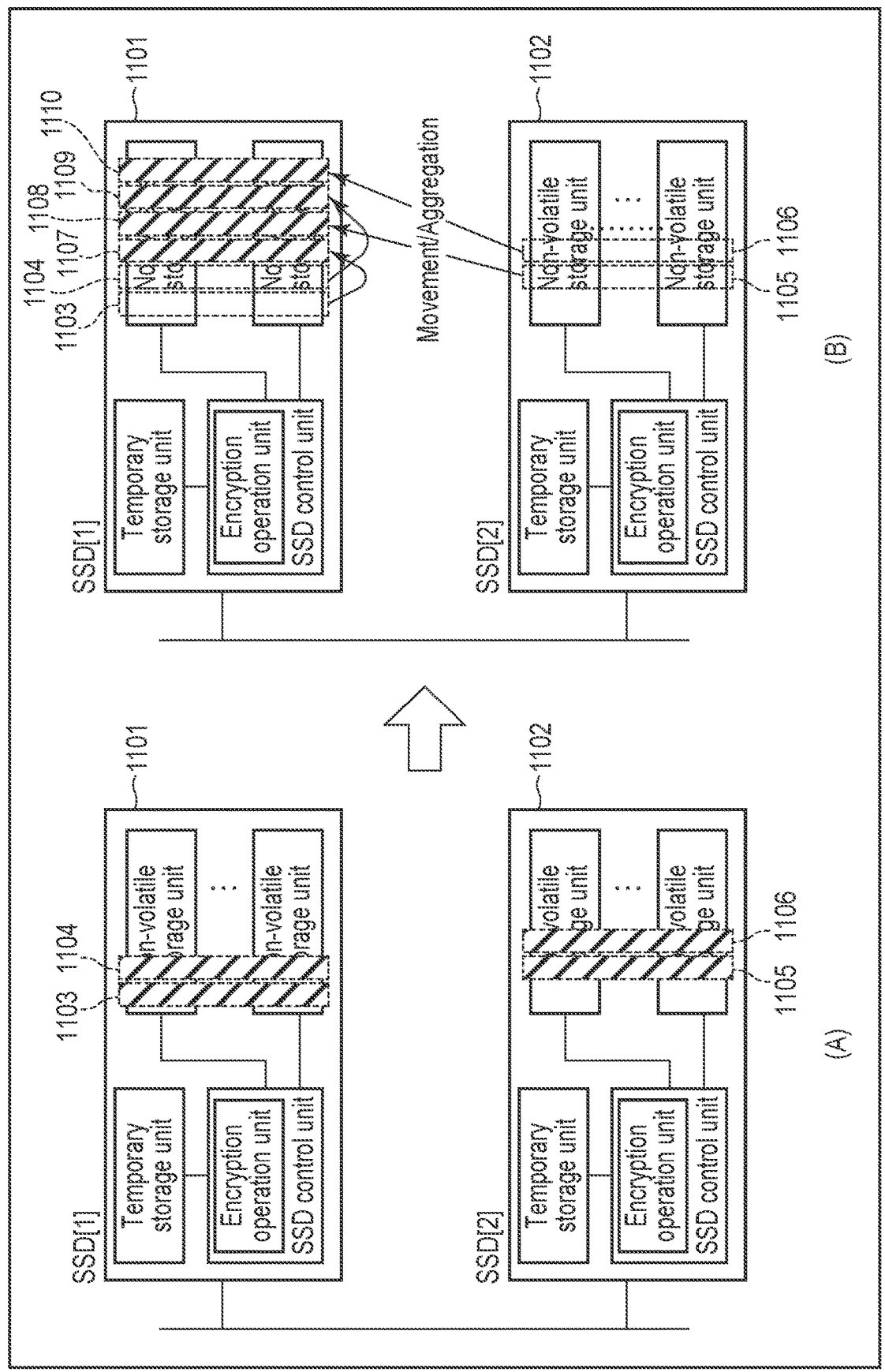
FIG. 11 is a schematic diagram related to a series of division processes assuming that the number of SSDs in a storage system of a third embodiment is two.

FIG. 11 is a schematic diagram of operations. The third embodiment is characterized in that, as described in relation to the second embodiment, in addition to the movement from regions 1105 and 1106 in an SSD[2] 1102 as a source device to regions 1108 and 1110 in an SSD[1] 1101 as a destination device, movement also takes places within the SSD[1] 1101 as a destination device as illustrated in FIG. 11. Such movement is particularly effective when the SSD contains non-volatile storage units having different characteristics. For example, in order to execute writing at a high speed, data is written in regions 1103 and 1104 functioning as SLCs, and the data is moved to TLC regions (or QLC regions) 1107 and 1109 at a timing when there is a margin for the I/O processing. The region to be written first may be implemented as dedicated hardware, or a part of the region as a TLC/QLC NAND flash may be implemented so as to exert appropriate characteristics under the control of the control unit. That is, a non-volatile storage unit having characteristics such as a high rewriting speed and a high number of acceptable write-erase cycle is used.

The schematic diagram of FIG. 11 illustrates an example of aggregating the data into one SSD having been subjected to the reuse processing. Alternatively, the data may be aggregated into the other SSD not having been subjected to the reuse processing. At this time, the SSD as a destination device does not need to have a function of executing the reuse processing of the present invention, and may be a normal SSD. In the case of using such a dedicated SSD as a destination device, it is not necessary to intentionally create an empty region at the time of the reuse processing as illustrated in FIG. 10. The third embodiment is as described above. By using a non-volatile storage unit high in writing speed and number of acceptable write-erase cycle as a temporary storage destination of the reuse processing, it is possible to achieve both writing performance and a large capacity.

Fourth Embodiment

In each of the embodiments described above, a plurality of SSDs is mounted in a storage device to utilize parallelism. In contrast, the present embodiment utilizes parallelism in one SSD. FIG. 12 is a functional block diagram of the present embodiment. The present embodiment includes an SSD 1201 and a host 1200. The SSD 1201 is connected to the host via an I/F unit 1202. As in the first to third embodiments, the SSD 1201 includes an SSD control unit 1203 that controls the operation of the SSD 1201, a temporary storage unit 1204, and non-volatile storage units. The non-volatile storage units are divided into operation groups 1208a to 1208m capable of parallel operation as viewed from the SSD control unit 1203. The operation groups include non-volatile storage units 1207a(1) to 1207a(N), . . . , and 1207m(1) to 1207m(N). In this block diagram, the non-volatile storage units constituting each operation group and the SSD control unit 1203 are connected by one line. However, this does not mean that there is one actual communication path.

Inside the SSD control unit 1203, there are a distribution unit 1205 and encryption operation units as in the above-described embodiments. A plurality of encryption operation units is mounted in order to take advantage of parallelism. In this example, n encryption operation units 1206a to 1206n are mounted. In addition, this number of encryption operation units may be the same as the number m of operation groups of the non-volatile storage units (m=n), or may be different (m≠n). In the case of m=n, the encryption operation units and the operation groups are associated with each other on a one-to-one basis, so that a complicated process such as scheduling for executing a process on the encryption operation units can be omitted. In particular, in the case of m>n, since the parallelism of encryption processing is lower than the parallelism of writing to the non-volatile storage units, there is a possibility of causing a decrease in throughput at the time of writing. However, the number of encryption operation units may be determined in consideration of factors such as a mounting cost and an occupied area and power consumption when the control unit is implemented by hardware.

The operation sequence of the present embodiment is the same as that of the first embodiment although the components are different. Therefore, description of details will be omitted.

Modification Examples

In the functional block diagram of FIG. 12, the distribution unit and the encryption operation units are mounted in the SSD control unit. As modification examples, they may be mounted outside the SSD control unit (however, the housing or substrate is in common with the SSD). An SSD 1301 illustrated in FIG. 13 is an example in which a distribution unit 1305 is externally attached to an SSD control unit 1303, and an SSD 1401 illustrated in FIG. 14 is an example in which encryption operation units 1406a to 1406n are externally attached to the SSD control unit 1403. An SSD 1501 illustrated in FIG. 15 is an example in which both a distribution unit 1305 and encryption operation units 1406a to 1406n are externally attached to an SSD control unit 1503. External attachment to the SSD control unit has advantages of configuring the SSD by utilizing assets such as the existing SSD control unit, changing the parallelism according to the performance required by the SSD, and the like.

The modifications illustrated in FIGS. 13 to 15 of the present embodiment illustrated in FIG. 12 can be similarly applied to the first to third embodiments.

Fifth Embodiment

In each of the embodiments described above, the storage device includes a distribution function that utilizes parallelism. In the present embodiment, the distribution function is realized on the host side, and the SSD is implemented in a form including only the encryption operation function without the distribution function.

FIG. 16 is a functional block diagram of the present embodiment. A storage system 1600 includes a host 1601, a plurality of SSD[1] 1610 to SSD[n] 1620, and a network 1603 connecting them. The configuration described in relation to the above embodiments can be applied except that there is no distribution function inside the SSD. The SSD[1] 1610 is configured such that an encryption operation unit is built in an SSD control unit as described in relation to the first embodiment, and the SSD[n] is configured such that the encryption operation unit is externally attached to the SSD control unit as described in relation to the fourth embodiment. Although only two types are illustrated in the drawing, other types may be combined as appropriate. In addition, as described in relation to the second and third embodiments, in the case of aggregating the data after the reuse processing in a specific SSD, the SSD for aggregation may be separately connected to the network 1603. The network 1603 may be a network capable of external connection such as Infiniband™ or Ethernet™, or may be a network on the premise of internal connection such as PCIe™ or CXL™.

The operation sequence of the present embodiment is the same as those of the first to third embodiments although the components are different. Therefore, description of details will be omitted.

(Supplement Based on Encryption Algorithm for Reuse Processing)

An example in which reuse processing of the ciphertext is performed using the device in each embodiment described above will be described. FIG. 17 illustrates an overall flow related to reuse processing (bootstrap process) in a case where a homomorphic encryption scheme to be used is CGGI (TFHE) in the storage system of each embodiment. The reuse processing executed in the present embodiment roughly includes three steps (Blind Rotate, Sample Extract, Identity Key Switch). Blind Rotate is a step of accepting ciphertext $$c=(\vec{a},b)$$

from which noise is to be removed, a bootstrap key and a test vector as inputs, and outputting a first intermediate result. The first intermediate result is expressed as ciphertext in a format of TRLWE. Sample Extract is a step of receiving the first intermediate result and ciphertext in the form of $$(\vec{0},u)$$

and outputting a second intermediate result. The second intermediate result has the same format as the ciphertext c, but has a different encryption key. Identity Key Switch is a step of receiving the second intermediate result and the Key-Switch key, and outputting noiseless ciphertext $$c'=(\vec{a},b')$$

encrypted with the same encryption key in the same format as the ciphertext c from which noise is to be removed and with less noise.

In the present embodiment, at least one of the above-described three steps is distributed among the encryption operation units of each SSD. The step(s) that have not been distributed are executed by combining methods such as executing by the CPU in the host, processing by the control unit or the encryption operation unit in the aggregation destination SSD, and processing at the time of reading. Further, there are roughly two distribution processing methods: one is to perform distribution processing in units of reuse processing of ciphertext (corresponding to LM bits in the first embodiment) (all the three steps illustrated in FIG. 17 are performed on one fragment in the same SSD), and the other one is to perform distribution processing by subdivisions of reuse processing (the three steps illustrated in FIG. 17 are performed on one fragment in a plurality of SSDs).

In the following description, the first embodiment (FIG. 1 is a functional block diagram) will be taken as an example. However, the following description can be similarly applied to the other embodiments.

(Case of Dividing and Distributing Data by Constituent of Ciphertext)

As described with reference to FIG. 2, in the embodiments described above, division and distribution are performed in units of reuse processing of ciphertext. The encryption operation units of each SSD sequentially execute the above-described three steps on the allocated fragments. In addition, since the initial values required for the reuse processing (corresponding to the ciphertext constitution information and the auxiliary information in the first embodiment) are the same in all the fragments, the distribution unit included in the control unit 104 of the storage device 102 generates one initial value (reuse processing unit length, bootstrap key, test vector, and Key-Switch key) and notifies each SSD of the initial value.

Figure 18:
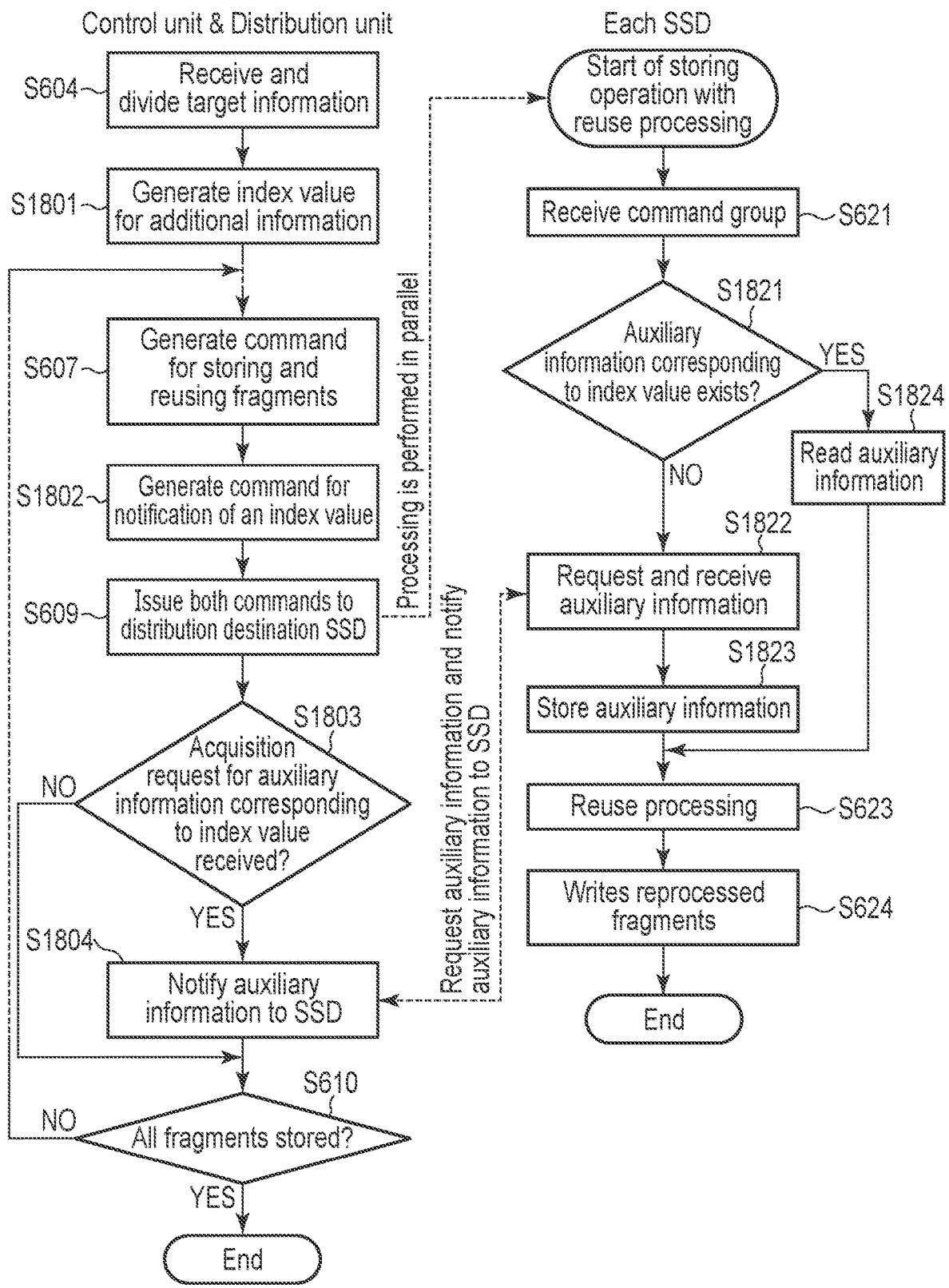
FIG. 18 is a flowchart updated such that dividing and distributing in the flowchart of FIG. 6 are performed by constituent unit of ciphertext.

Each SSD performs the reuse processing using the initial value. Each SSD may assign an appropriate index to the initial value and store it therein (as described in FIG. 6 and the related explanation). This eliminates the need to receive the initial value again in subsequent processing using the same initial value. Accordingly, when transmitting the initial value, the control unit 104 or the distribution unit 106 generates an index using an index generation algorithm (for example, a hash function) in common among the SSDs, and provides notification of only the index value instead of providing notification of the entire initial value. Each SSD checks whether it holds the initial value matching the index value. If holding the initial value, the SSD reads the initial value and starts the reuse processing. When not holding the initial value, the SSD requests the control unit 104 or the distribution unit 106 to provide notification of the initial value, and then receives the initial value. In general, since the data size of the bootstrap key necessary for the reuse processing is large, it can be expected by holding the bootstrap key information in the SSD to reduce the data transfer time between the control unit 104 or the distribution unit 106 and each SSD and to reduce the processing load associated with the data transfer. FIG. 18 is a flowchart illustrating operations of division and distribution in units of ciphertext configuration in the storage system according to the present embodiment. FIG. 18 is an update of FIG. 6 based on the above description.

The control unit 104 divides the target information (step S604) and generates an index value for the additional information (step S1801). The control unit 104 also generates a command for storing fragments in the SSD[1] to SSD[n] (110(1) to (110(n)) (step S607), generates a command for providing notification of an index value (step S1802), and issues the commands to the corresponding SSD (step S609).

Upon receipt of an acquisition request for the auxiliary information corresponding to the index value from an SSD (step S1803: YES), the control unit 104 provides the requested auxiliary information to the SSD (step S1804). If no acquisition request for the auxiliary information corresponding to the index value is received (step S1803: NO), this is because there exists the already provided auxiliary information in the SSD. After issuing the command for all the fragments (YES in step S610), the control unit 104 ends the operation. When there is any fragment for which a command has not been issued (step S610: NO), the control unit 104 repeats the processing from step S607.

Each SSD that has received the commands issued in step S609 performs reuse processing and read processing. Upon receipt of the commands (step S621), if there is no auxiliary information corresponding to the index value (NO in step S1821), the SSD transmits an acquisition request to the control unit 104, and receives the auxiliary information from the control unit 104 (step S1822). The SSD stores the received auxiliary information (step S1823). On the other hand, if the auxiliary information corresponding to the index value exists (YES in step S1821), the SSD reads the auxiliary information in the SSD (step S1824).

When all the information necessary for the reuse processing is prepared, the SSD performs the reuse processing (step S623), and stores the data with reduced noise generated by the reuse processing (step S624).

Figure 19:
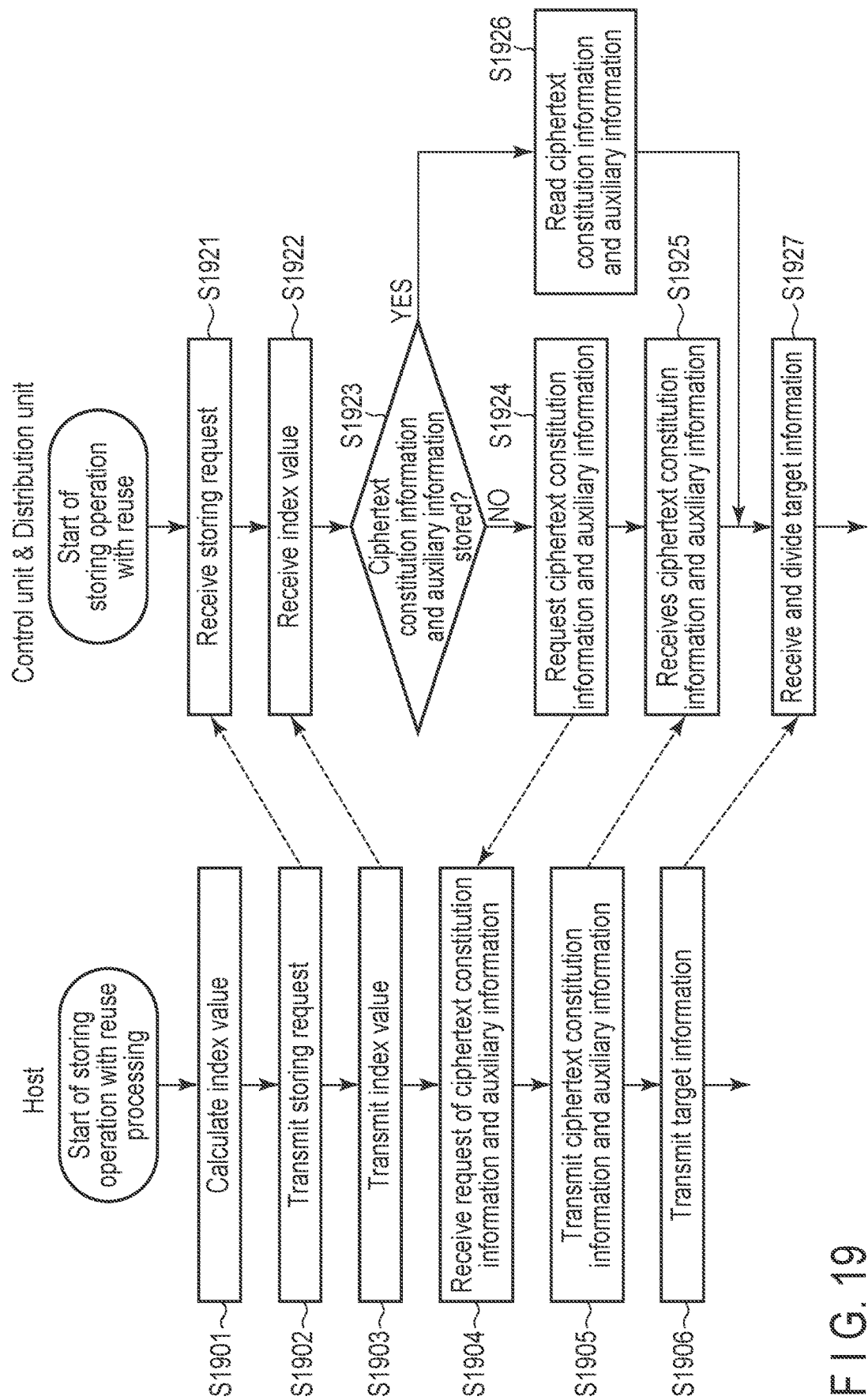
FIG. 19 is a flowchart illustrating a procedure in a case where a method for reducing notifications of ciphertext constitution information and auxiliary information is used between the host and the storage device in the storage system of each embodiment.

The method of reducing the provision of the ciphertext constitution information and the auxiliary information between the control unit 104 or the distribution unit 106 and each SSD has been described. The same method may be used between the host 101 and the storage device 102. In this case, the host 101 generates an index value for the ciphertext constitution information and the auxiliary information provided in notification and notifies the control unit 104 of the storage device 102 of the index value. The control unit 104 refers to the correspondence table (as illustrated in FIG. 8) held in the temporary storage unit 105, to check whether the corresponding index value is stored in the SSD. If the information is not stored, the control unit 104 obtains the information from the host, and appropriately uses and stores the information. FIG. 19 is a flowchart illustrating a procedure of the method of reducing provision of the ciphertext constitution information and the auxiliary information between the host 101 and the storage device 102.

First, the host 101 generates an index value for the ciphertext constitution information and the auxiliary information (step S1901). The host 101 transmits a request for storing the index value to the storage device 102 (step S1902), and then transmits the index value to the storage device 102 (step S1903).

Upon receipt of a request for the ciphertext constitution information and the auxiliary information from the storage apparatus 102 (step S1904), the host 101 transmits the ciphertext constitution information and the auxiliary information to the storage apparatus 102 (step S1905). Then, the host 101 transmits the target information to the storage device 102 (step S1906).

The storage device 102 receives the request for storing the index value from the host 101 (step S1921), and then receives the index value from the host 101 (step S1922). If the ciphertext constitution information and the auxiliary information corresponding to the index value are not stored (NO in step S1923), the storage device 102 requests for the ciphertext constitution information and the auxiliary information from the host 101 (step S1924). Then, the storage device 102 receives the ciphertext constitution information and the auxiliary information from the host 101 (step S1925). On the other hand, if the ciphertext constitution information and the auxiliary information corresponding to the index value are stored (step S1923: YES), the storage device 102 reads the ciphertext constitution information and the auxiliary information in the storage device 102 (step S1926). The storage device 102 receives the target information itself to be stored from the host 101, and divides the target information based on the ciphertext constitution information and the auxiliary information (step S1927).

(Case of Calculating Operation Results in Advance, and Dividing and Distributing Data in Consideration of Storing State)

In the series of embodiments described above, necessary calculation is executed on occasion arises in the encryption operation unit of each SSD. In the present embodiment, necessary operation results are executed in advance and held in each non-volatile storage unit, and read and used as necessary. The functional block diagram of the present embodiment is the same as that of the first embodiment. Although is similarly applicable to other embodiments, the functional blocks will be described here in relation to configuration of the first embodiment.

The control unit and the distribution unit in the present embodiment have a function of instructing each SSD to execute operations required in the reuse processing and save the operation results in advance, or a function of instructing each SSD to save operation results of calculation performed outside the information storage device. These operations include, for example, an operation (f(v)) of applying a function f to one value v of ciphertext expressed in the form of a vector or a polynomial, and an operation necessary for addition, multiplication, or the like of a polynomial having a coefficient expressed in a range of 16 bit integers and for acquiring a remainder under a certain method. That is, the operations include addition or multiplication of coefficients under a certain method. Examples of the function f include a step function, a sigmoid function, a ReLU function, an identity function, and a Softmax function. The control unit and the distribution unit may issue instructions after specifying an appropriate identifier indicating operation results for storing.

Since all possible values require a very large capacity to hold the operation results, the possible values may be defined discretely. For example, a 16 bit integer can take a range of −32768 to 32767, but the number of results to be calculated and held in advance can be reduced by rounding the operation to 128 units or 1024 units. Not only a range of integers but also a polynomial having a value of a real number as a coefficient can be handled in the same manner.

When instructing each SSD to perform an operation, the control unit and the distribution unit allocate a range of operator of the operation to each SSD so that the address of the non-volatile storage unit in which the operation result is stored can be mechanically determined (by simple calculation or the like) from the value of the operator. There may be overlap between the SSDs in the responsible range, and all the SSDs may be responsible for the same range (for example, the entire possible values of the operator). This is a trade-off between the size of the region required to hold the operation results and parallel executability, and parallel execution can be performed by using a larger region (holding the results so as to permit overlapping). In the case of allocating a certain range to each SSD in this manner, each SSD may have a mechanism of allocating one address to the value of the smallest operator in charge and obtaining the address of the non-volatile storage unit storing the results according to the difference from the value (This function may be implemented in the encryption operation unit as part of the encryption processing, or may be implemented by software or a dedicated circuit on the SSD control unit).

The control unit or the distribution unit holds, in the temporary storage unit, the correspondence relationship between the operator and the operand and the SSD that has executed the operation (=the SSD that holds the operation results), and performs control so as to allocate a part of the operation to be performed in the reuse processing to the SSD that holds the result. If a plurality of SSDs holds the results for the same operator, in consideration of advantages and disadvantages of parallel processing and continuous processing, the control unit and the distribution unit may distribute the results so that the results can be processed in parallel, or may distribute the results so that the results can be processed continuously.

If each SSD does not hold the corresponding operation results in the reuse processing, each SSD notifies the control unit and the distribution unit to acquire necessary information from the other SSD, or receives an instruction to aggregate the information into the other SSD capable of processing. As a result, the reuse processing is appropriately executed.

In realizing the present embodiment, each SSD that holds the operation results does not need to read the operation results from the non-volatile storage unit each time. Since the result of an operation performed in advance can be managed in association with specific conditions (a bootstrap key required for reuse processing or an identifier thereof, an index value described in relation to the foregoing embodiment, and the like), it is preferable to cache the read results in the temporary storage unit in the SSD as much as possible until the conditions are changed. It is most preferable that all the operation results under the conditions can be cached, but this increases the necessary capacity of the temporary storage unit. Therefore, the operation results are appropriately managed using a certain cache algorithm (for example, FIFO, LIFO, LRU, LFU, LRFU, or the like), so that necessary results can be held in the temporary storage unit.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. An information storage device configured to divide and store a set of first ciphertext fragments into a plurality of storages, the set of the first ciphertext fragments being generated by dividing first ciphertext that is encrypted with a first key and is capable of at least one type of operation of addition or multiplication without decryption, the information storage device comprising:
   distribution circuitry configured to
      receive a first identifier, constitution information, a second key, and a deformation command, the first identifier specifying an address of the information storage device of the first ciphertext, the constitution information specifying a constitution of the first ciphertext, the second key being used for deforming the first ciphertext, the deformation command using a second key for the first ciphertext,
      generate or specify the set of the first ciphertext fragments based on the first identifier and the constitution information,
      generate a deformation command to deform at least one fragment belonging to the set of the first ciphertext fragments using the second key, and
      allocate the deformation command to at least one of the storages as a destination storage for the first ciphertext fragment; and
   a temporary storage configured to hold the first identifier, an address of a location where each of the first ciphertext fragments is stored in a storage determined by the distribution circuitry, and an order which the first ciphertext is divided into fragments, wherein
   the storage includes
   a non-volatile storage configured to hold information,
   control circuitry configured to control reading/writing of information from/to the non-volatile storage, and
   encryption processing circuitry configured to
      deform the first ciphertext fragment by using the second key based on the deformation command, and
      store a second ciphertext fragment as a result of the deformation in the non-volatile storage by requesting from the control circuitry instead of the first ciphertext fragment, or output the second ciphertext fragment as a read result.

2. The information storage device of claim 1, wherein:
   the constitution information is information specifying a deformation processing unit length when a deformation process is performed on the first ciphertext including an encryption scheme or a length of an encryption key applied to the first ciphertext; and
   the distribution circuitry is further configured to
      determine a length of the first ciphertext fragment based on the deformation processing unit length that can be specified from the constitution information and a length that can be processed by the encryption processing circuitry of the storage at a time under the deformation command,
      generate or specify the first ciphertext fragment based on the first identifier, the length of the first ciphertext fragment, and the order information, and
      notify the storage of the first ciphertext fragment as a processing target of the deformation command.

3. The information storage device of claim 2, wherein the distribution circuitry is further configured to, when storing the first ciphertext is requested,
   select one of the storages that store the second ciphertext fragment as an integration destination storage, or select one of at least one storage that is not used to store the second ciphertext fragment as an integration destination storage,
   generate a duplication command or a movement command to be read from each storage holding the second ciphertext fragments and to be saved in the integration destination storage, an address of the information storage device in the integration destination storage being set such that each second ciphertext fragment is continuous based on the order of generation of the first ciphertext fragment, and
   relocate a relationship between the first identifier and the storage location of each fragment held in the temporary storage to a relationship between the first identifier and an address in the integration destination storage in accordance with completion of execution of the duplication command or the movement command.

4. The information storage device of claim 3, wherein the distribution circuitry is further configured to, when generating the deformation command deforming the first ciphertext fragment deformation at the integration destination storage,
   leave a space to store the second ciphertext fragment that is copied or moved from a storage other than the integration destination storage such that the whole second ciphertext can be read sequentially.

5. The information storage device of claim 3, wherein the distribution circuitry is further configured to notify each storage of the duplication command or the movement command based on the order which the first ciphertext is divided into fragments.

6. The information storage device of claim 3, wherein:
   the storage further includes a plurality of non-volatile storages having different characteristics,
   a first non-volatile storage is faster in read and/or write throughput, or/and higher in endurance than the other non-volatile storage, and
   a second non-volatile storage is larger in storable capacity per unit area than the other non-volatile storage; and
   the distribution circuitry is configured to
      designate the first non-volatile storage as a storage for storing a result of the deformation command, and designate the second non-volatile storage as a storage for storing a result of the movement command or the duplication command.

7. The information storage device of claim 2, wherein the distribution circuitry is further configured to, upon receipt of a request for reading the first ciphertext,
generate a read command to read each fragment of the corresponding second ciphertext based on the storage corresponding to the first identifier held in the temporary storage, and the address of the storage and order information of the storage,
notify the read command of each storage according to the order information, and
continuously output each fragment of the second ciphertext read from each storage as the second ciphertext obtained by performing deformation processing on the first ciphertext.

8. The information storage device of claim 2, wherein:
the temporary storage is further configured to hold, for the first ciphertext fragments, the second key, the constitution information, and execution status of the deformation processing on each first ciphertext fragment; and
the distribution circuitry is further configured to control an execution timing of the deformation processing based on an execution state or a load of the deformation processing by each storage.

9. The information storage device of claim 1, wherein the distribution circuitry further includes:
a function of generating at least one operation table generation command for instructing a non-volatile storage of each storage to store an operation result of an operation required for deforming the first ciphertext and the second key in association with each other, and notifying each storage of the at least one operation table generation command together with the second key or identification information of the second key; and
a function of generating an operation table read command to read the stored operation result from the non-volatile storage of the storage based on the second key and store in a temporary storage of each storage, and notifying the operation table read command together with the second key,
the distribution circuitry is further configured to:
generate the set of the first ciphertext fragments by dividing the first ciphertext according to a status of result of the operation in the storage,
generate the operation table read command and notify each storage holding the operation result of the operation table read command, and
notify the storage of the deformation command for deforming the first ciphertext fragment,
the storage further includes a temporary storage configured to temporarily hold at least a part of the operation result,
the storage is further configured to specify the operation result held in the storage based on the second key in response to reception of the operation table read command, and read at least the part of the operation result to the temporary storage, and
the encryption processing circuitry is further configured to, when deforming the first ciphertext fragment using the second key based on the deformation command, execute partial processing of the deformation based on the operation result read in the temporary storage.

10. The information storage device of claim 9, wherein the storage is configured to perform an operation required for deforming the first ciphertext by the encryption processing circuitry, in response to reception of the operation table generation command to generate an operation result.

11. An information storage system comprising:
host circuitry configured to generate a set of first ciphertext fragments by dividing first ciphertext that is encrypted with a first key and is capable of at least one type of operation of addition or multiplication without decryption; and
a plurality of storages configured to store the first ciphertext fragments, wherein
the host circuitry includes:
distribution circuitry configured to
receive a first identifier that specifies a storage destination of the first ciphertext, constitution information that specifies a constitution of the first ciphertext, a second key used for deforming the first ciphertext, and a deformation command using a second key for the first ciphertext,
generate or specify the set of the first ciphertext fragments based on the first identifier and the constitution information,
generate a deformation command to deform at least one fragment belonging to the set of the first ciphertext fragments, and
allocate the deformation command to at least one of the storages as a destination storage for the first ciphertext fragment; and
a temporary storage configured to hold the first identifier, an address of a location where each of the first ciphertext fragments is stored in a storage determined by the distribution circuitry, and an order which the first ciphertext is divided into fragments, and
the storage includes:
a non-volatile storage configured to hold information;
control circuitry configured to control reading/writing of information from/to the non-volatile storage; and
an encryption processing circuitry configured to deform the first ciphertext fragment by using the second key based on the deformation command, and store a second ciphertext fragment as a result of the deformation in the non-volatile storage by requesting from the control circuitry instead of the first ciphertext fragment.

12. The information storage system of claim 11, wherein:
the constitution information is information specifying a deformation processing unit length when a deformation process is performed on the first ciphertext including an encryption scheme or a length of an encryption key applied to the first ciphertext; and
the distribution circuitry is further configured to
determine a length of the first ciphertext fragment based on the deformation processing unit length that can be specified from the constitution information and a length that can be processed by the encryption processing circuitry of the storage at a time under the deformation command,
generate or specify the first ciphertext fragment based on the first identifier, the length of the first ciphertext fragment, and the order information, and
notify the storage of the first ciphertext fragment as a processing target of the deformation command.

13. The information storage system of claim 12, wherein the distribution circuitry is further configured to, when storing the first ciphertext is requested, select one of the storages that store the second ciphertext fragment as an integration destination storage, or select one of at least one storage that is not used to store the second ciphertext fragment as an integration destination storage, generate a duplication command or a movement command to be read from each storage holding the second ciphertext fragments and to be saved in the integration destination storage, an address of the information storage device in the integration destination storage being set such that each second ciphertext fragment is continuous based on the order of generation of the first ciphertext fragment, and relocate a relationship between the first identifier and the storage location of each fragment held in the temporary storage to a relationship between the first identifier and an address in the integration destination storage in accordance with completion of execution of the duplication command or the movement command.

14. The information storage system of claim 13, wherein the distribution circuitry is further configured to, when generating the deformation command deforming the first ciphertext fragment deformation at the integration destination storage, leave a space to store the second ciphertext fragment that is copied or moved from a storage other than the integration destination storage such that the whole second ciphertext can be read sequentially.

15. The information storage system of claim 13, wherein the distribution circuitry is further configured to notify each storage of the duplication command or the movement command based on the order which the first ciphertext is divided into fragment.

16. The information storage system of claim 13, wherein:
the storage further includes a plurality of non-volatile storages having different characteristics,
a first non-volatile storage is faster in read and/or write throughput, or/and higher in endurance than the other non-volatile storage, and
a second non-volatile storage is larger in storable capacity per unit area than the other non-volatile storage; and
the distribution circuitry is configured to
designate the first non-volatile storage as a storage for storing a result of the deformation command, and
designate the second non-volatile storage as a storage for storing a result of the movement command or the duplication command.

17. The information storage system of claim 12, wherein the distribution circuitry is further configured to, upon receipt of a request for reading the first ciphertext,
generate a read command to read each fragment of the corresponding second ciphertext based on the storage corresponding to the first identifier held in the temporary storage, and the address of the storage and order information of the storage,
notify the reading command of each storage according to the order information, and
continuously output each fragment of the second ciphertext read from each storage as the second ciphertext obtained by performing deformation processing on the first ciphertext.

18. The information storage system of claim 12, wherein:
the temporary storage is further configured to hold, for the first ciphertext fragments, the second key, the constitution information, and execution status of the deformation processing on each first ciphertext fragment; and
the distribution circuitry is further configured to control an execution timing of the deformation processing based on an execution state or a load of the deformation processing by each storage.

19. The information storage system of claim 11, wherein the distribution circuitry further includes:
a function of generating at least one operation table generation command for instructing a non-volatile storage of each storage to store an operation result of an operation required for deforming the first ciphertext and the second key in association with each other, and notifying each storage of the at least one operation table generation command together with the second key or identification information of the second key; and
a function of generating an operation table read command to read the stored operation result from the non-volatile storage of the storage based on the second key and store in a temporary storage of each storage, and notifying the operation table read command together with the second key,
the distribution circuitry is further configured to:
generate the set of the first ciphertext fragments by dividing the first ciphertext according to a status of result of the operation in the storage;
generate the operation table read command and notify each storage holding the operation result of the operation table read command; and
notify the storage of the deformation command for deforming the first ciphertext fragment,
the storage further includes a temporary storage configured to temporarily hold at least a part of the operation result,
the storage is further configured to specify the operation result held in the storage based on the second key in response to reception of the operation table read command, and read at least the part of the operation result to the temporary storage, and
the encryption processing circuitry is further configured to, when deforming the first ciphertext fragment using the second key based on the deformation command, execute partial processing of the deformation based on the operation result read in the temporary storage.

20. The information storage system of claim 19, wherein the storage is configured to perform an operation required for deforming the first ciphertext by the encryption processing circuitry, in response to reception of the operation table generation command to generate an operation result.

* * * * *